United States Patent
Anzai et al.

(10) Patent No.: US 7,778,135 B2
(45) Date of Patent: Aug. 17, 2010

(54) OPTICAL RECORDING MEDIUM, METHOD FOR RECORDING/REPRODUCING INFORMATION TO/FROM OPTICAL RECORDING MEDIUM AND APPARATUS FOR RECORDING/REPRODUCING INFORMATION

(75) Inventors: Joji Anzai, Osaka (JP); Shinichi Kadowaki, Hyogo (JP); Osamu Kajino, Osaka (JP); Masanari Mohri, Hyogo (JP)

(73) Assignee: Panasonic Corporation, Osaka (JP)

( * ) Notice: Subject to any disclaimer, the term of this patent is extended or adjusted under 35 U.S.C. 154(b) by 710 days.

(21) Appl. No.: 11/659,034

(22) PCT Filed: Aug. 5, 2005

(86) PCT No.: PCT/JP2005/014444

§ 371 (c)(1),
(2), (4) Date: Jan. 31, 2007

(87) PCT Pub. No.: WO2006/013978

PCT Pub. Date: Feb. 9, 2006

(65) Prior Publication Data

US 2009/0028027 A1    Jan. 29, 2009

(30) Foreign Application Priority Data

Aug. 5, 2004 (JP) ............................. 2004-229257
Sep. 2, 2004 (JP) ............................. 2004-255207

(51) Int. Cl.
  *G11B 7/20* (2006.01)
  *G11B 3/70* (2006.01)
(52) U.S. Cl. ........................ 369/94; 369/283
(58) Field of Classification Search ............ 369/94, 369/283
See application file for complete search history.

(56) References Cited

U.S. PATENT DOCUMENTS 5,134,604 A   7/1992   Nagashima et al.

(Continued)

FOREIGN PATENT DOCUMENTS

JP      3-209642      9/1991

(Continued)

OTHER PUBLICATIONS

Noriyoshi Shida et al., "The BD-Type Multi-Layer 100 GB ROM Disk using the Photopolymer Sheet", Technical Digest of International Symposium on Optical Memory, Nov. 3, 2003, pp. 10-11.

*Primary Examiner*—Wayne R Young
*Assistant Examiner*—Aneeta Yodichkas
(74) *Attorney, Agent, or Firm*—Wenderoth, Lind & Ponack, L.L.P.

(57) ABSTRACT

The present invention provides an optical information medium capable of suppressing the influence of reflection light from an unnecessary information recording face and effectively eliminating spherical aberration at the time of recording/reproducing information to/from a recording medium having a plurality of information recording faces. When reflectance of an information recording face is $\alpha h$ and transmittance between information recording faces is th, $\alpha h$ and th of the optical information medium are set so as to satisfy $((\alpha(h-1)^2 \times \alpha(h-2))/(th^2 \times \alpha h)) < 0.01$.

8 Claims, 17 Drawing Sheets

U.S. PATENT DOCUMENTS

| | | |
|---|---|---|
| 5,511,057 A | 4/1996 | Holtslag et al. |
| 5,864,530 A | 1/1999 | Holtslag et al. |
| 6,187,406 B1 * | 2/2001 | Ichihara et al. ............ 428/64.1 |
| 6,606,291 B2 * | 8/2003 | Ichihara et al. .......... 369/53.31 |
| 6,893,698 B2 * | 5/2005 | Narumi et al. ............. 428/64.1 |
| 7,143,426 B2 | 11/2006 | Mishima et al. |
| 2004/0139459 A1 | 7/2004 | Mishima et al. |

FOREIGN PATENT DOCUMENTS

| | | |
|---|---|---|
| JP | 6-267110 | 9/1994 |
| JP | 2001-155380 | 6/2001 |
| JP | 2004-213720 | 7/2004 |

* cited by examiner

Base material thickness difference (μm)

FIG. 16

| | | Combinations | | | | | | | | | |
|---|---|---|---|---|---|---|---|---|---|---|---|
| | | 1 | 2 | 3 | 4 | 5 | 6 | 7 | 8 | 9 | 10 |
| 43a | d(1) | A | A | A | A | A | A | | | | |
| 43b | d(2) | B | B | B | A | A | A | A | A | | A |
| 43c | d(3) | | B | B | B | B | A | B | B | A | A |
| 43d | d(4) | | | B | | B | B | | B | B | B |

Unit: μm

| Distance (μm) between layer surfaces | | Combinations | | | | | | | | | |
|---|---|---|---|---|---|---|---|---|---|---|---|
| | | 1 | 2 | 3 | 4 | 5 | 6 | 7 | 8 | 9 | 10 |
| d(1) | 59.5 | A | A | A | A | A | A | | | | |
| d(2) | 13.5 | B | B | B | A | A | A | A | A | | A |
| d(3) | 17.5 | | B | B | B | B | A | B | B | A | A |
| d(4) | 9.5 | | | B | | B | B | | B | B | B |
| A (surface-side thickness) total | | 59.5 | 59.5 | 59.5 | 73 | 73 | 90.5 | 13.5 | 13.5 | 17.5 | 31 |
| B (back-side thickness) total | | 13.5 | 31 | 40.5 | 17.5 | 27 | 9.5 | 17.5 | 27 | 9.5 | 9.5 |
| Difference between A and B | | 46 | 28.5 | 19 | 55.5 | 46 | 81 | 4 | 13.5 | 8 | 21.5 |
| Variation fluctuation amount | | 3 | 4.5 | 6 | 4.5 | 6 | 6 | 3 | 4.5 | 3 | 4.5 |
| Determination | | ○ | ○ | ○ | ○ | ○ | ○ | ○ | ○ | ○ | ○ |

FIG. 18

| Minimum thickness tmin (μm) | | 8 | 8 | 8 | 8 | 9 | 9 |
|---|---|---|---|---|---|---|---|
| Distance emin between layers (μm) | | 1 | 1 | 1 | 2 | 1 | 1 |
| Variation (μm) in distance between layers | Maximum value e(1) | 7.5 | 7 | 3 | 6.5 | 7.5 | 6 |
| | e(2) | 1.5 | 1.5 | 2 | 1.5 | 1.5 | 1.5 |
| | e(3) | 1.5 | 2 | 2 | 1.5 | 1.5 | 2 |
| | e(4) | 1.5 | 1.5 | 2 | 1.5 | 1.5 | 1.5 |
| Distance between layers | d(1) | 59.5 | 59 | 55 | 56.5 | 56.5 | 56 |
| | d(2) | 13.5 | 13.5 | 15 | 14.5 | 14.5 | 14.5 |
| | d(3) | 17.5 | 18 | 20 | 19.5 | 18.5 | 19 |
| | d(4) | 9.5 | 9.5 | 10 | 9.5 | 10.5 | 10.5 |
| Total of distances d(2) to d(4) each between layers | | 40.5 | 41 | 45 | 43.5 | 43.5 | 44 |
| Total of distances d(1) to d(4) each between layers | | 100 | 100 | 100 | 100 | 100 | 100 |
| Total of variations e(1) to e(4) in distance between layers | | 12 | 12 | 9 | 11 | 12 | 11 |

OPTICAL RECORDING MEDIUM, METHOD FOR RECORDING/REPRODUCING INFORMATION TO/FROM OPTICAL RECORDING MEDIUM AND APPARATUS FOR RECORDING/REPRODUCING INFORMATION

FIELD OF THE INVENTION

The present invention relates to an optical recording medium to/from which information is recorded/reproduced by being irradiated with light, a method for recording/reproducing optical information, and an apparatus for recording/reproducing optical information.

BACKGROUND ART

There are commercial optical disks called DVD and BD as high-density, large-capacity optical information recording media. Such optical disks are being rapidly spread recently as recording media for recording images, music, and computer data. An optical disk having a plurality of recording layers as shown in Japanese Unexamined Patent Publication No. 2001-155380 to further increase the recording capacity has been also proposed.

FIGS. 19 and 20 show the configuration of a conventional optical recording medium and a conventional optical pickup.

First, FIG. 19 will be described. An optical recording medium 401 in FIG. 19 has information recording faces 401a and 401b. Thickness d1 of a protection layer from the surface of the information recording face 401a is 0.075 mm, and thickness d2 of a protection layer from the surface of the information recording face 401b is 0.1 mm.

The case of recording/reproducing information to/from the information recording face 401b will be described.

A light source 1 such as a semiconductor laser emits a linearly polarized beam 70 having a wavelength λ1 of 405 nm. The diverging beam 70 emitted from the light source 1 passes through a collimate lens 53 having spherical aberration correcting units 93 and whose focal length f1 is 15 mm and enters a polarization beam splitter 52. The beam 70 which has entered the polarization beam splitter 52 passes through the polarization beam splitter 52 and passes through a quarter-wave plate 54 where it is transformed to circularly polarized light. After that, the circularly polarized light is converted to a converged beam by an objective lens 56 having a focal length f2 of 2 mm. The converged beam passes through a transparent substrate of the optical recording medium 401 and is condensed onto the information recording face 401b. In FIG. 19, the position of the collimate lens 53 is controlled by the spherical aberration correcting units 93 so that spherical aberration becomes almost 0 mλ in the information recording face 401b. The opening of the objective lens 56 is regulated by an aperture 55, and numerical aperture NA is 0.85. The beam 70 reflected by the information recording face 40b passes through the objective lens 56 and the quarter-wave plate 54 and is transformed to a linearly polarized beam which is different from the incoming linearly polarized beam by 90 degrees, and is reflected by the polarization beam splitter 52. The beam 70 reflected by the polarization beam splitter 52 passes through a condenser lens 59 whose focal length f3 is 30 mm and is transformed to a converged beam. The converged beam passes through a cylindrical lens 57 and enters a photodetector 32. Astigmatism is given to the beam 70 when it passes through the cylindrical lens 57.

The photodetector 32 has four light receiving parts (not shown). The light receiving parts output current signals I30a to I30d according to received light amounts, respectively.

A focus error (hereinbelow, called FE) signal caused by the astigmation method is obtained by (I30a+I30c)−(I30b+I30d). A tracking error (hereinbelow, called TE) signal in the push-pull method is obtained by (I30a+I30d)−(I30b+I30c). An information (hereinbelow RF) signal recorded on the recording medium 401 is obtained by I30a+I30b+I30c+I30d. The FE signal and the TE signal are subjected to amplification and phase-compensation to a desired level, and the resultant signals are supplied to actuators 91 and 92 and subjected to focus and tracking controls.

In the case of recording/reproducing information to/from the information recording face 401b, the position of the collimate lens 53 is controlled by the spherical aberration correcting units 93 so that spherical aberration becomes almost 0 mλ in the information recording face 401a.

Next, FIG. 20 will be described. FIG. 20 shows the configuration of an optical pickup having a configuration similar to that of FIG. 19. The diverging beam 70 emitted from the light source 1 passes through the collimate lens 53 having spherical aberration correcting units 93 and whose focal length f1 is 15 mm and enters the polarization beam splitter 52. The beam 70 which has entered the polarization beam splitter 52 passes through the polarization beam splitter 52 and passes through the quarter-wave plate 54 where it is transformed to circularly polarized light. After that, the circularly polarized light is converted to a converged beam by the objective lens 56 having the focal length f2 of 2 mm. The converged beam passes through the transparent substrate of the optical recording medium 401 and is condensed onto any one of recording layers 401a, 401b, 401c, and 401d formed in the optical recording medium 401. The objective lens 56 is designed so that spherical aberration becomes zero in an intermediate depth position between the recording layers 401a and 401d. Spherical aberration which occurs in the case where the beam is condensed to any of the recording layers 401a to 401d is eliminated by moving the position of the collimate lens 53 in the optical axis direction by the spherical aberration correcting units 93.

The opening of the objective lens 56 is regulated by the aperture 55, and numerical aperture NA is set as 0.85. The beam 70 reflected by the recording layer 401d passes through the objective lens 56 and the quarter-wave plate 54 and is transformed to a linearly polarized beam which is different from the incoming linearly polarized beam by 90 degrees, and is reflected by the polarization beam splitter 52. The beam 70 reflected by the polarization beam splitter 52 passes through the condenser lens 59 whose focal length f3 is 30 mm and is transformed to a converged beam. The converged beam passes through the cylindrical lens 57 and enters the photodetector 32. Astigmatism is given to the beam 70 when it passes through the cylindrical lens 57.

The photodetector 32 has not-shown four light receiving parts which output current signals according to received light amounts. From the current signals, a focus error (hereinbelow, called FE) signal caused by the astigmation method, a tracking error (hereinbelow, called TE) signal caused by the push-pull method, and an information (hereinbelow RF) signal recorded on the recording medium 401 are generated. The FE signal and the TE signal are subjected to amplification and phase-compensation to a desired level, and the resultant signals are supplied to the actuators 91 and 92 and subjected to focus and tracking controls.

Distance d1 from the surface of the optical recording medium 401 to the recording layer 401a, distance d2 from the recording layer 401a to the recording layer 401b, distance d3 from the recording layer 401b to the recording layer 401c, and distance d4 from the recording layer 401c to the recording layer 401d are set so that their ratios are d1:d2:d3:d4=2:3:4:5. The reason why the distances d1 to d4 are not set to the same distances but are set at the ratios will be described below.

If the distances d1 to d4 are the same, the following problem occurs. For example, when the beam 70 is condensed to the recording layer 401d to record/reproduce information to/from the recording layer 401d, part of the beam 70 is reflected by the recording layer 401c. Since the distance from the recording layer 401c to the recording layer 401d and the distance from the recording layer 401c to the recording layer 401b are the same, part of the beam 70 reflected by the recording layer 401c forms an image on the back side of the recording layer 401b. The reflected beam is reflected again by the recording layer 401c and mixed with reflected light from the recording layer 401d from which information is to be inherently read. Further, since the distance between the recording layer 401b to the recording layer 401d and the distance from the recording layer 401b to the surface 401z of the optical recording medium 401 are the same, part of the beam 70 reflected by the recording layer 401b forms an image on the back side of the optical recording medium 401. The reflected beam is reflected again by the recording layer 401b and mixed with reflected light from the recording layer 401d from which information is to be inherently read. The reflection light that forms an image on the back side of another layer overlaps and is mixed with reflection light from the recording layer 401d from which information is to be inherently read. A problem occurs such that the mixed light hinders recording/reproduction.

To prevent the problem, a method is disclosed in which the distances between the recording layers are set so as to become gradually longer from the surface 401z of the optical recording medium 401. When the beam 70 is condensed to the recording layer 401d from which information is to be inherently read, images are not formed simultaneously on the back side of the recording layer 401b and the back side of the surface 401z (refer to Japanese Unexamined Patent Publication No. 2001-155380). Each of the distances d1 to d4 has manufacture variations of ±10 μm. Since the distances d1 to d4 have to be set so as to be different from each other even in the case where the distances d1 to d4 vary, the difference between the distances is set to, for example, 20 μm. In this case, d1=40 μm, d2=60 μm, d3=80 μm, and d4=100 μm. Total interlayer distance d (=d2+d3+d4) from the recording layer 401a to the recording layer 401d is 240 μm.

To realize larger capacity, it is considered to increase the number of multiple layers of the recording layer. In the case of an optical recording medium having a plurality of recording layers, if the interlayer distances of signal faces (signal face distances) including variations are the same, due to the influence of a signal face different from a signal face from which information is to be inherently read, it is difficult to read a stable signal. For example, in the case of an optical disk having four signal faces, at the time of reading a signal from the fourth face, the optical pickup is focus-controlled so that focus is achieved on the fourth face. However, a part of the beam is reflected by the third layer and focus is achieved on the signal face of the second layer. The beam reflected by the second layer in which focus is achieved is again reflected by the third layer, and the reflected beam travels in the same optical path as that of the beam reflected by the fourth face and enters a detector of the optical pickup. The beam reflected by the second layer exerts an adverse influence on a signal of the fourth face from which a signal is to be inherently read.

To solve the problem, Japanese Unexamined Patent Publication No. 2001-155380 presents a technique of reading a more stable signal by changing the thickness of a base material between neighboring information recording faces. In practice, however, a stable signal cannot be read only by changing the thickness of the base material. More specifically, in the conventional configuration, by making the values of the interlayer distances d1 to d4 different from each other, mixture of reflection light from a recording layer to/from which information is recorded/reproduced with reflection light whose focus is achieved on the back side of another layer can be prevented. When the distance between layers is set in consideration of even variations of the distance between layers, there is a case that the total interlayer distance d (=d2+d3+d4) becomes extremely large. When the total interlayer distance d increases, the absolute amount of spherical aberration to be corrected increases, and a problem occurs such that remaining aberration which cannot be removed by the spherical aberration correcting units 93 also increases. When the total interlayer distance d is small, the spherical aberration correcting units 93 can remove the spherical aberration almost perfectly. However, when the total interlayer distance d increases and the absolute value of the spherical aberration increases, jitter becomes worse due to the remaining aberration which cannot be removed, and the adverse influence is exerted on recording/reproduction.

DISCLOSURE OF THE INVENTION

The present invention has been achieved to solve the above-described problems and an object of the invention is to provide an optical recording medium in which reflection light from a medium surface and reflection light from a signal face of a layer from which information is not inherently read is reduced and the influence on reflection light from a signal face of a specific layer from which information is to be inherently read is reduced. Another object of the invention is to provide an optical recording medium capable of suppressing an occurrence amount of spherical aberration and effectively eliminating spherical aberration by spherical aberration correcting units.

The present invention provides an optical recording medium having a plurality of information recording faces, wherein when a first information recording face and an h-th information recording face are set from the side close to the surface of the optical recording medium (where h denotes an integer satisfying $h \geq 2$), reflectance of the surface is set as $\alpha 0$, reflectance of the first information recording face is set as $\alpha 1$, and reflectance of the h-th information recording face is set as $\alpha h$, and transmittance from the surface to the first information recording face is set as t1, and transmittance from the (h−1)th information recording face to the h-th information recording face is set as th, $((\alpha(h-1)^2 \times \alpha(h-2))/(th^2 \times \alpha h)) < 0.01$ is satisfied.

With the configuration, the optical recording medium in which the influence on reflection light from a signal face of a specific layer from which information is to be inherently read is suppressed can be provided.

The present invention provides another optical recording medium having a plurality of information recording faces, wherein when a first information recording face and an h-th information recording face are set from the side close to the surface of the optical recording medium (where h denotes an integer satisfying $h \geq 2$), reflectance of the surface is set as $\alpha 0$, reflectance of the first information recording face is set as $\alpha 1$, and reflectance of the h-th information recording face is set as $\alpha h$, transmittance from the surface to the first information recording face is set as t1, and transmittance from the (h−1)th information recording face to the h-th information recording face is set as th, and distance from the surface to the first information recording face is d1 and distance from the (h−1) information recording face to the h-th information recording face is dh, $((\alpha(h-1)^2 \times \alpha(h-2))/(th^2 \times \alpha h)) \leq 0.0014 \times (dh-d(h-1))^2 + 0.0011 \times (dh-d(h-1)) + 0.0099$ is satisfied.

With the configuration, an optical recording medium in which the influence on reflection light from a signal face of a specific layer from which information is to be inherently read is reduced can be provided.

In the another optical recording medium according to the invention, preferably, each of d1 and dh is 8 μm or larger.

The another optical recording medium according to the invention further includes a sheet material between the information recording faces in the optical recording medium.

In the another optical recording medium according to the present invention, preferably, the sheet material has any one of thicknesses of 10 μm, 15 μm, 20 μm, 25 μm, or 30 μm, and thickness tolerance is ±2 μm or less.

In the another optical recording medium according to the present invention, preferably, the sheet material is formed between the information recording faces so that the sheet materials having different thicknesses are adjacent to each other.

The present invention has further another optical recording medium having a plurality of information recording faces, wherein when a first information recording face and an h-th information recording face are set from the side close to the surface of the optical recording medium (where h denotes an integer satisfying h≧2), reflectance of the surface is set as α0, reflectance of the first information recording face is set as α1, and reflectance of the h-th information recording face is set as αh, transmittance from the surface to the first information recording face is set as t1, and transmittance from the (h−1)th information recording face to the h-th information recording face is set as th, refractive index of a protection layer from the surface to the first information recording face is set as n1, and refractive index of a protection layer from the (h−1)th information recording face to the h-th information recording face is set as nh, and distance between neighboring information recording faces is set as d (μm), $((\alpha(h-1)^2 \times \alpha(h-2))/(th^2 \times \alpha h)) \leq 0.0006 \times (d \times (nh-n(h-1)))^2 + 0.0007 \times (d \times (nh-n(h-1))) + 0.0099$ is satisfied.

With the configuration, an optical recording medium in which the influence on reflection light from a signal face of a specific layer from which information is to be inherently read is reduced can be provided.

The present invention also provides a further another optical recording medium having a plurality of information recording faces, wherein when a first information recording face and an h-th information recording face are set from the side close to the surface of the optical recording medium (where h denotes an integer satisfying h≧2), reflectance of the surface is set as α0, reflectance of the first information recording face is set as α1, and reflectance of the h-th information recording face is set as αh, transmittance from the surface to the first information recording face is set as t1, and transmittance from the (h−1)th information recording face to the h-th information recording face is set as th, refractive index of a protection layer from the surface to the first information recording face is set as n1, and refractive index of a protection layer from the (h−1)th information recording face to the h-th information recording face is set as nh, and distance from the surface to the first information recording face is set as d1 (μm), and distance from the (h−1)th information recording face to the h-th information recording face is set as dh (μm), $((\alpha(h-1)^2 \times \alpha(h-2))/(th^2 \times \alpha h)) \leq 0.0006 \times (dh \times nh - (d(h-1) \times n(h-1)))^2 + 0.0007 \times (dh \times nh - (d(h-1) \times n(h-1))) + 0.0099$ is satisfied.

With the configuration, an optical recording medium in which the influence on reflection light from a signal face of a specific layer from which information is to be inherently read is reduced can be provided.

The optical recording medium according to the invention has four information recording faces.

In the optical recording medium according to the invention, preferably, a phase-change recording film is provided on the information recording face.

In the optical recording medium according to the invention, preferably, a recording film made of a material containing an organic coloring matter is provided on the information recording face.

In the optical recording medium according to the invention, preferably, a label is provided on a face on the side opposite to the surface of the optical recording medium.

The present invention also provides an optical recording medium having n (n≧2) information recording faces, wherein when distance between the j-th (j is an integer satisfying 2≦j≦n) from the side close to the surface of the optical recording medium to the "j−1"th information recording face is set as d(j), total sum including variations from j=2 to j=n of the distance d(j) is 90 μm or less.

Consequently, the optical recording medium capable of suppressing an occurrence amount of spherical aberration and effectively eliminating spherical aberration by spherical aberration correcting units can be provided.

In the optical recording medium according to the invention, when distance between the surface of the optical recording medium and the first information recording face on the side closest to the surface is set as d(1), and variations of the distance d(j) (j is an integer satisfying 1≦j≦n) are set to ±e(j) μm or less, |d(i)−d(k)|≧e(i)+e(k)+1 (where i and k are integers satisfying 1≦i≦n and 1≦k≦n and i≠k) is satisfied.

In the optical recording medium according to the invention, preferably, the distance d(j) (j is an integer satisfying 2≦j≦n) is 8 μm or larger.

In the optical recording medium according to the invention, when n≧4, the distance d(j) (j is an integer satisfying 4≦j≦n) satisfies |d(j−3)+d(j−2)−d(j−1)−d(j)|≧e(j−3)+e(j−2)+e(j−1)+e(j)+1.

In the optical recording medium according to the invention, when n=4, d(1)−d(2)−d(3)−d(4)≧e(1)+e(2)+e(3)+e(4)+1 is satisfied.

In the optical recording medium according to the invention, preferably, d(1) is 50 μm or larger.

In the optical recording medium according to the invention, preferably, d(1)+d(2)+d(3)+d(4) lies within the range of 100±12 (μm).

In the optical recording medium according to the invention, |d(2)+d(3)−d(4)|≧e(2)+e(3)+e(4)+1 and |d(2)−d(3)−d(4)|≧e(2)+e(3)+e(4)+1 are satisfied.

In the optical recording medium according to the invention, preferably, d(3) is the largest among d(2), d(3), and d(4).

The present invention also provides an optical recording medium having four information recording faces, the four information recording faces are set as a first information recording face, a second information recording face, a third information recording face, and a fourth information recording face in order from the side closest to the surface of the optical recording medium, distance from the surface to the first information recording face is d1 (μm), distance from the first information recording face to the second information recording face is d2 (μm), distance from the second information recording face to the third information recording face is d3 (μm), and distance from the third information recording face to the fourth information recording face is d4(μm), d1≧50 (μm), d2+d3+d4≧24 (μm), d2+d3+d4≦90 (μm), and |d4+d3−d2−d1|≧1 (μm) are satisfied.

The invention also provides an optical recording medium having three information recording faces, the three information recording faces are set as a first information recording face, a second information recording face, and a third information recording face in order from the side closest to the surface of the optical recording medium, distance from the surface to the first information recording face is d1 (μm), distance from the first information recording face to the second information recording face is d2 (μm), and distance from the second information recording face to the third information recording face is d3 (μm), d1≧50 (μm), d2+d3≧16 (μm), d2+d3≦90 (μm), and |d3−d2−d1|≧1 (μm) are satisfied.

The invention also provides a method for recording/reproducing information to/from the optical recording medium, wherein at least one of recording and reproduction of information is performed by using an optical head having aberration correcting units for correcting aberration which occurs depending on thickness of a protection layer of the optical recording medium.

The invention also provides an apparatus for recording/reproducing information to/from the optical recording medium, comprising: an optical head for emitting light to the optical recording medium, and achieving a focus of the light on a desired information recording face in the optical recording medium; a controller for controlling the optical head; a rotating unit for rotating the optical recording medium; and recording/reproducing units for performing at least one of recording and reproduction of information to/from the optical recording medium.

The invention also provides an apparatus for recording/reproducing information to/from the optical recording medium, comprising: an optical head for emitting light to the optical recording medium, and achieving a focus of the light on a desired information recording face in the optical recording medium; a controller for controlling the optical head; a rotating unit for rotating the optical recording medium; recording/reproducing units for performing at least one of recording and reproduction of information to/from the optical recording medium; and spherical aberration correcting units for making the light emitted to the optical recording medium diverged or converged in accordance with an information recording face to/from which information is recorded/reproduced.

According to the present invention, an optical recording medium in which the influence on reflection light from a signal face of a layer from which information is to be inherently read is reduced can be realized. An optical recording medium capable of effectively eliminating spherical aberration can be also realized.

BRIEF DESCRIPTION OF THE DRAWINGS

FIG. 16 is a diagram showing combinations of distances between layer surfaces having the possibility that reflection light of an information recording face to/from which information is recorded/reproduced is mixed with reflection light focused on the back side of another layer.

FIG. 17 is a diagram showing an example of combinations of distances between layer surfaces in the invention.

FIG. 18 is a diagram showing an example of combinations of distances between layer surfaces in the invention.

Figure 1:
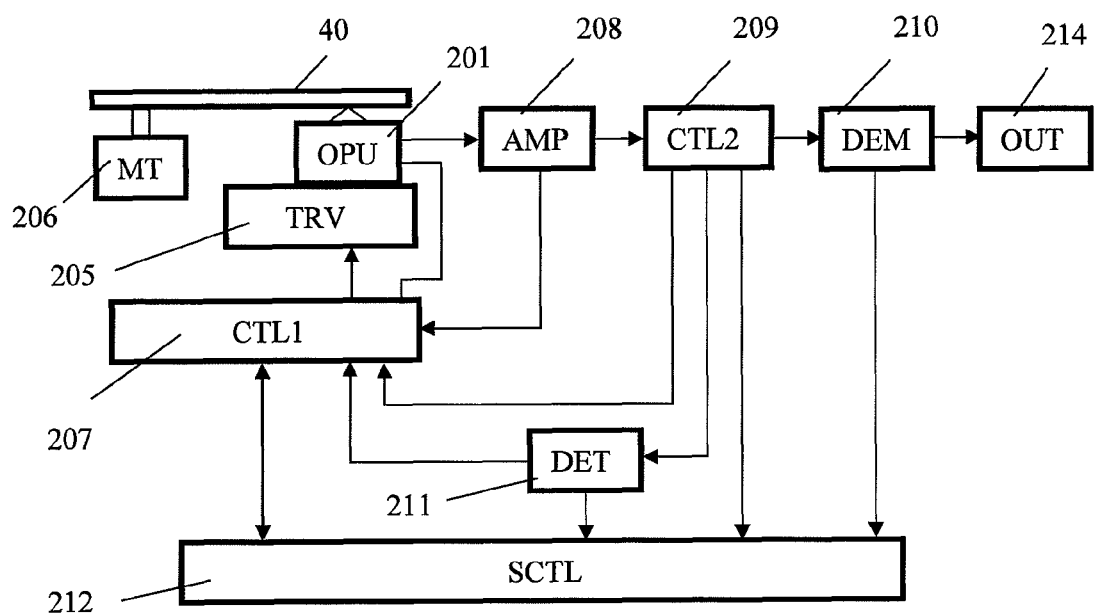
FIG. 1 is a diagram showing the configuration of an optical information apparatus in the invention.

DESCRIPTION OF REFERENCE NUMERALS 1 light source
32 photodetector
40, 41, 42, 43 optical recording media
40a to 40d, 41a to 41d, 42a to 42d, 43a to 43d information recording faces
52 polarization beam splitter
53 collimate lens
54 quarter-wave plate
55 aperture
56 objective lens
57 cylindrical lens
59 detection lens
70, 71 beams
91, 92 actuators
93 spherical aberration correcting units

DETAILED DESCRIPTION OF THE PREFERRED EMBODIMENTS

Embodiments of an optical recording medium, an optical information apparatus, an optical pickup head, and an optical information reproducing method for the present invention will be described hereinbelow with reference to the appended drawings. In the drawings, the same reference numerals express the same elements, similar actions, or similar operations.

First Embodiment

A first embodiment of the invention will be described hereinbelow with reference to FIGS. 1 and 2.

FIG. 1 shows the configuration of an optical information apparatus according to the invention. An optical pickup head apparatus 201 (also called an optical pickup) emits a laser beam having a wavelength λ of 405 nm to an optical recording medium 40, and reproduces a signal recorded on the optical recording medium 40. A transport controller 205 moves the optical pickup head apparatus 201 along the radial direction of the optical recording medium 40 in order to record/reproduce information in an arbitrary position on the optical recording medium 40. A motor 206 for driving the optical recording medium 40 rotates the optical recording medium 40. A controller 207 controls the optical pickup head apparatus 201, the transport controller 205, and the motor 206.

An amplifier 208 amplifies a signal read by the optical pickup head apparatus 201. An output signal from the amplifier 208 is input to a controller 209. On the basis of the output signal, the controller 209 generates servo signals such the FE signal and the TE signal necessary for the optical pickup head apparatus 201 to read the signal of the optical recording medium 40 and outputs the generated signals to the controller 207. The signal input to the controller 209 is an analog signal, and the controller 209 converts the analog signal to a digital signal (binarization). A demodulator 210 analyzes the digital signal read from the optical recording medium 40, reconstructs data of original video image, music, or the like, and outputs the reconstructed signal from an output unit 214.

A detector 211 detects an address signal or the like on the basis of the signal output from the controller 209, and outputs the detected signal to a system controller 212. The system controller 212 identifies the optical recording medium 40 on the basis of physical format information and optical recording medium manufacture information (optical recording medium management information) read from the optical recording medium 40, decodes a recording/reproduction condition, and the like, and controls the whole optical information apparatus. In the case of recording/reproducing information to/from the optical recording medium 40, the controller 207 controls the transport controller 205 in accordance with an instruction from the system controller 212. As a result, the transport controller 205 moves the optical pickup head apparatus 201 onto a desired position on an information recording face 40b formed on the optical recording medium 40 which will be described in FIG. 2. The optical pickup head apparatus 201 records/reproduces information to/from the information recording face 40b of the optical recording medium 40.

Figure 2:
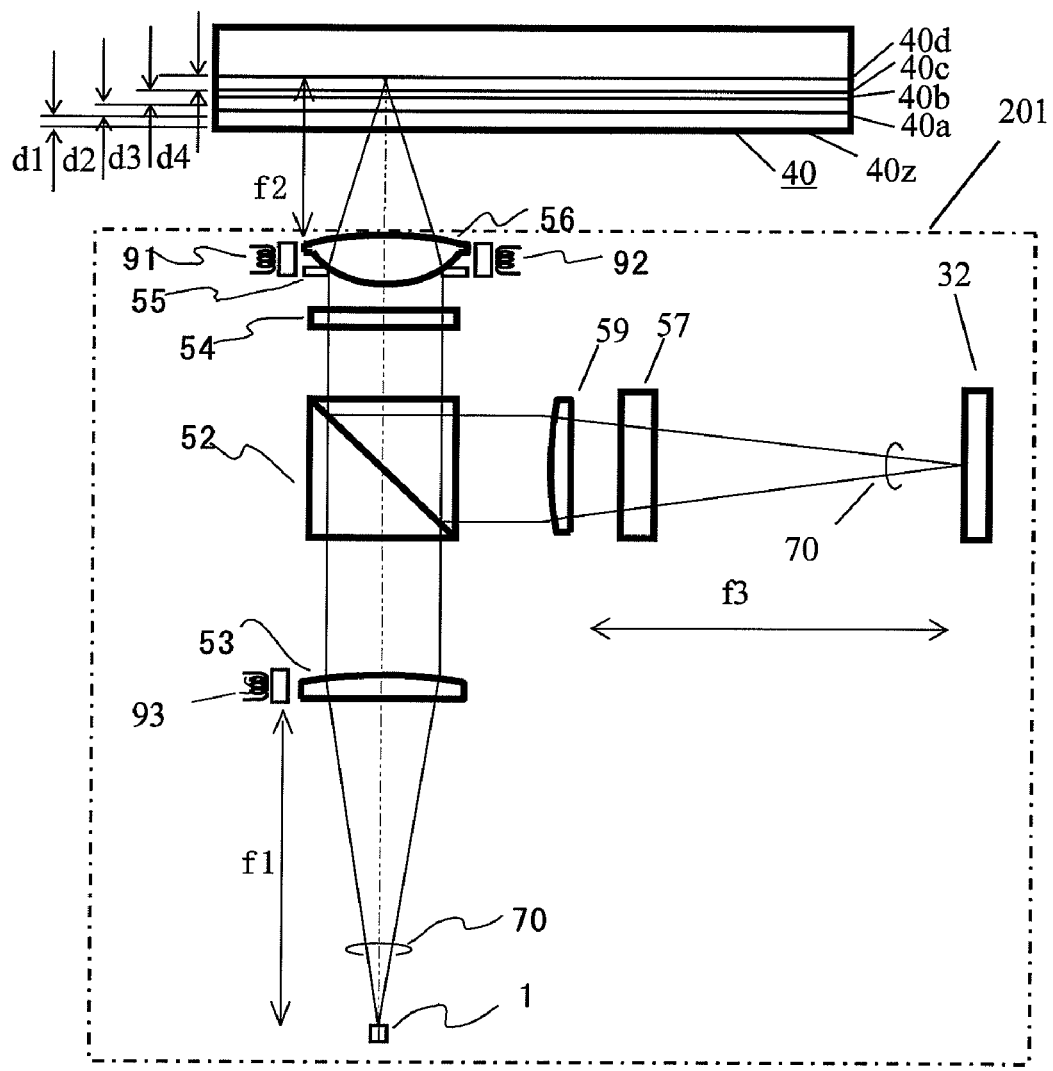
FIG. 2 is a diagram showing an outline of the configuration of an optical recording medium and an optical pickup in the invention.

FIG. 2 shows an example of the configuration of the optical recording medium 40 and the optical pickup head apparatus 201 according to the invention. Four information recording faces are formed in the optical recording medium 40. Information recording faces 40a, 40b, 40c, and 40d are formed in order from the side of the surface of the optical recording medium 40. The base material thickness from the surface to the information recording face 40a is d1, the base material thickness from the information recording face 40a to the information recording face 40b is d2, the base material thickness from the information recording face 40b to the information recording face 40c is d3, and the base material thickness from the information recording face 40c to the information recording face 40d is d4.

The case of recording/reproducing information to/from the information recording face 40d will be described.

A light source 1 emits a linearly-polarized divergent beam 70 having a wavelength λ of 405 nm. The beam 70 emitted from the light source 1 is transformed by a collimate lens 53 having a focal length f1 of 18 mm to parallel rays. After that, the parallel rays pass through a polarization beam splitter 52 and a quarter-wave plate 54 where the rays are transformed to circularly polarized light. The circularly polarized light is converted to a converged beam by an objective lens 56 having a focal length f2 of 2 mm. The converged beam passes through a transparent substrate formed on the optical recording medium 40 and is condensed onto the information recording face 40d. The opening of the objective lens 56 is regulated by an aperture 55, and numerical aperture NA is 0.85. The collimate lens 53 is adjusted in the optical axis direction by using spherical aberration correcting units 93 constructed by a stepping motor or the like so that the spherical aberration becomes almost 0 mλ in the information recording face 40d. The beam 70 reflected by the information recording face 40d passes through the objective lens 56 and the quarter-wave plate 54 and is transformed to a linearly polarized beam which is different from the incoming linearly polarized beam by 90 degrees, and is reflected by the polarization beam splitter 52. The beam 70 reflected by the polarization beam splitter 52 is split by a diffraction grating (not shown) as a beam splitting device to a beam 70 of the $0^{th}$ order and beams of the first order (not shown). The beams pass through a condenser lens 59 whose focal length f3 is 30 mm and a cylindrical lens 57 and enter a photodetector 32. Astigmatism is given to the beam 70 incident on the photodetector 32 when the beam 70 passes through the cylindrical lens 57.

When the refractive index "n" of d1 to d4 is 1.57 and d1 to d4 are almost equal to each other, the beam 70 converged by the objective lens 56 forms an image on the information recording face 40d, a part of the beam 70 is reflected as a beam (not shown, hereinafter referred to as a beam 71) in accordance with the reflectance of the information recording face 40c, and the beam 70 forms an image also on the information recording face 40b. The light that forms an image on the information recording face 40b is reflected according to the reflectance of the information recording face 40b and is reflected again by the information recording face 40c. The light travels in the same optical path as that of the light reflected from the information recording face 40d to/from which information is to be inherently recorded/reproduced, and enters the photodetector 32. The spot of the beam 70 and that of the beam 71 on the photodetector 32 have different light quantities and have shapes of almost the same size.

The beam 70 includes an inherently necessary signal and, on the other hand, the beam 71 is an unnecessary signal component. Particularly, due to the interference between the beams 70 and 71, a focus error signal fluctuates, and it becomes difficult to detect a stable signal depending on the light quantity of the beam 71 relative to the light quantity of the beam 70.

When the reflectance of the surface of the information recording medium is α0, that of the information recording face 40a is α1, that of the information recording face 40b is α2, that of the information recording face 40c is α3, that of the information recording face 40d is α4, transmittance of the part having the base material thickness d1 is t1, that of the part having the base material thickness d2 is t2, that of the part having the base material thickness d3 is t3, and that of the part having the base material thickness d4 is t4, the radio Sd of the light quantity after reflection from the information recording face 40 to the light quantity before incidence to the optical recording medium 40 is expressed as follows.

$$Sd = t1^2 \times t2^2 \times t3^2 \times t4^2 \times \alpha 4$$

The ratio Sb of the light quantity after reflection from the information recording face 40b to the light quantity before incidence to the optical recording medium 40 is expressed as follows.

$$Sb = t1^2 \times t2^2 \times t3^2 \times \alpha 3^2 \times \alpha 2$$

Figure 3:
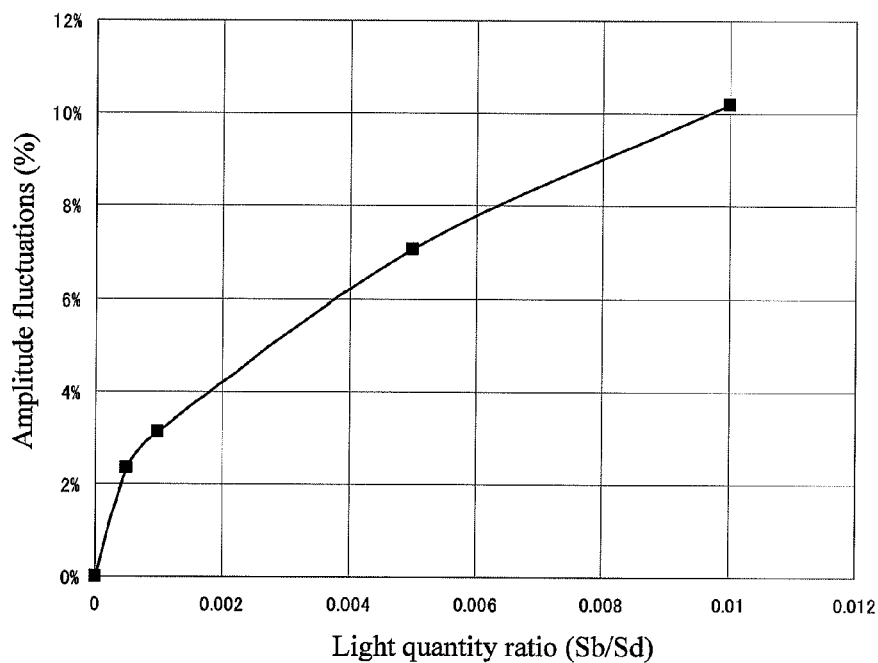
FIG. 3 is a diagram showing the relation between Sb/Sd and a focus fluctuation amount in the invention.

FIG. 3 shows the relation between the light quantity ratio Sb/Sd of Sb as unnecessary light to Sd including an inherently necessary signal (Sb/Sd=$(t1^2 \times t2^2 \times t3^2 \times \alpha 3^2 \times \alpha 2)/(t1^2 \times t2^2 \times t3^2 \times t4^2 \times \alpha 4) = (\alpha 3^2 \times \alpha 2)/(t4^2 \times \alpha 4)$) and a fluctuation amount of the focus error signal. The focus fluctuation amount indicates the focus control position with respect to a focus error signal amplitude. When the focus fluctuation amount increases, the quality of an inherently necessary spot on the information recording face 40d degrades, and it becomes difficult to record/reproduce accurate information. Usually, when the focus fluctuation amount becomes 10% or higher, an unstable state occurs in the system. By setting the value of Sb/Sd=$(\alpha 3^2 \times \alpha 2)/(t4^2 \times \alpha 4)$ to 0.01 or less as shown in FIG. 3, the focus fluctuation amount can be suppressed to 10% or less. Although the case of recording/reproducing information to/from the information recording face 40d has been described above, the cases of recording/reproducing information to/from other information recording faces are similar to the above. Although the information recording medium having four information recording faces has been described in the invention, the invention can be also applied to an information recording medium having "h" information recording faces. In this case, at the time of recording/reproducing information to/from the h-th face, unnecessary light that forms an image on the (h−2)th face exists. Consequently, by setting the transmittance th of a protection layer between the information recording faces in the optical recording medium 40 and reflectance αh of each of the information recording faces so that the ratio S(h−2)/Sh between the reflected light quantity Sh on the h-th face and the reflected light quantity S(h−2) on the (h−2)th face satisfies the relation $S(h-2)/Sh = ((\alpha(h-1)^2 \times \alpha(h-2))/(th^2 \times \alpha h)) < 0.01$, an optical recording medium capable of obtaining a stable signal can be realized. The distance "d" between the information recording faces needs a certain degree of the minimum thickness to prevent the influence of crosstalk of neighboring information recording faces. Therefore, in the case of addressing the problem only by changing the base material thickness between neighboring information recording faces in the proposal of JP-A No. 2001-155380, the problem can be avoided only by increasing the base material thickness. When the number of information recording faces increases, a problem occurs such that the total distance from the surface of the optical recording medium 40 to the deepest information recording face increases in consideration of variations in the base material thickness and the like. In contrast, in the present invention, the problem can be addressed only by the transmittance and the reflectance, so that the thickness between the information recording faces can be the minimum thickness. There is consequently an advantage such that the total distance from the surface of the optical recording medium to the deepest information recording face can be made short.

Second Embodiment

Figure 4:
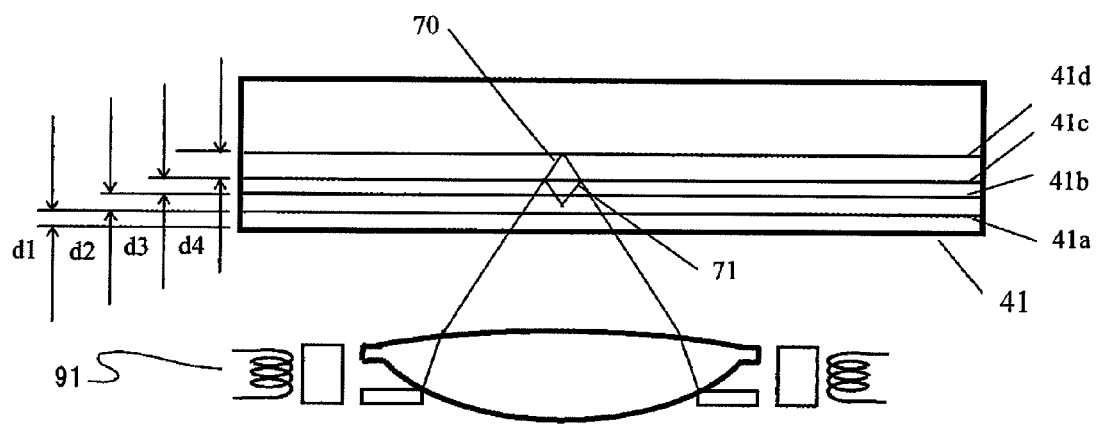
FIG. 4 is a diagram showing the relation between an optical recording medium and a beam emitted from an optical pickup in the invention.

FIG. 4 is a diagram showing an example of the configuration of an optical recording medium 41 according to a second embodiment.

Figure 5:
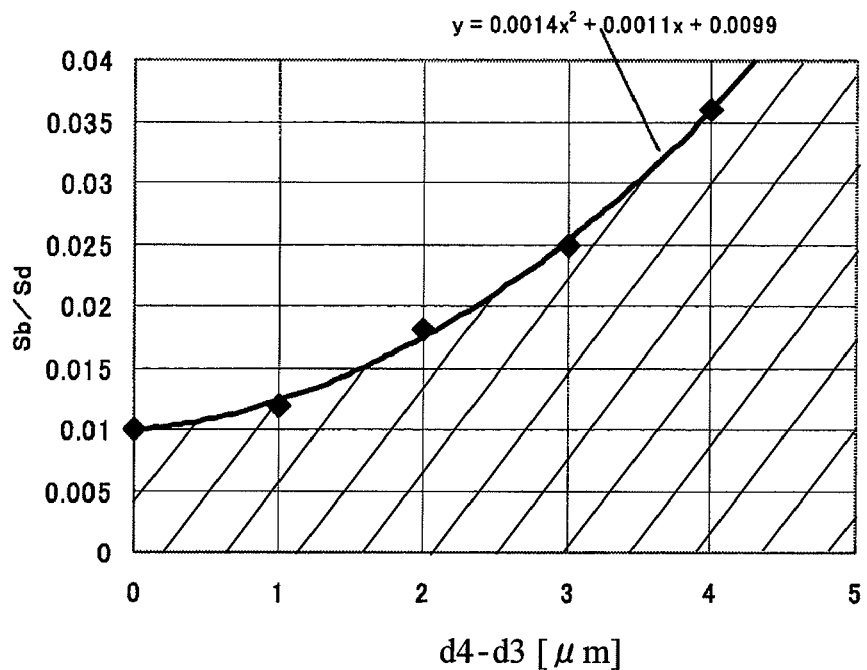
FIG. 5 is a diagram showing the relation of focus fluctuation amounts with respect to Sb/Sd and the thickness difference d4−d3 between neighboring base materials in the invention.

In the first embodiment, it is the precondition that the thickness dhμm between the information recording faces is constant. Consequently, to control the light amount ratio of Sb as unnecessary light to Sb including an inherently necessary information, the transmittance th of the protection layer between the information recording faces of the optical recording medium and the reflectance αh of each of the information recording faces are set. In this case, however, flexibility of the transmittance th and the reflectance αh is regulated. In the second embodiment, by changing the thickness dhμm between neighboring information recording faces, flexibility in setting of the transmittance th and the reflectance αh can be increased. For example, in the case of recording/reproducing information to/from an information recording face 41d in the optical recording medium 41 having four information recording faces as shown in FIG. 4, in a manner similar to the first embodiment, there is a beam 71 that forms an image around an information recording face 41b. However, when there is a thickness difference between d4 and d3, the image formation position of the beam 71 is shifted from the information recording face 41b, so that the image formation position on the photodetector 32 of the beam 71 reflected by the information recording face 41b is also deviated from that of a beam 70 reflected by the information recording face 41d. FIG. 5 shows the relation of a focus fluctuation amount to the thickness difference (d4−d3) between the base material thickness d4 and the base material thickness d3 and Sb/Sd as the ratio of Sb as unnecessary light to Sd including an inherently necessary signal. The region of (d4−d3) and Sb/Sd realizing the focus fluctuation amount of 10% or less at which the system is stable is shown by a hatched portion in FIG. 5. The relation of the focus fluctuation amount with respect to the thickness difference and the light quantity ratio is also applied to the case of recording/reproducing information to/from another signal recording face. The number of the signal recording faces is not limited to four, and the relation is applied to an optical information recording medium comprising a plurality of signal recording faces. Therefore, in an optical recording medium having h signal recording faces, by setting the transmittance th, reflectance αh, and the thickness dhμm so as to satisfy the relation of $((\alpha(h-1)^2 \times \alpha(h-2))/(th^2 \times \alpha h)) \leq 0.0014 \times (dh-d(h-1))^2 + 0.0011 \times (dh-d(h-1)) + 0.0099$, the focus fluctuation amount can be suppressed to 10% or less. Thus, the optical recording medium capable of obtaining a stable signal can be realized. By setting the minimum thickness of the distance dh between signal recording faces to 8 μm or larger, an optical recording medium which is not influenced by a crosstalk component of neighboring information recording faces in the system can be realized.

Third Embodiment

Figure 6:
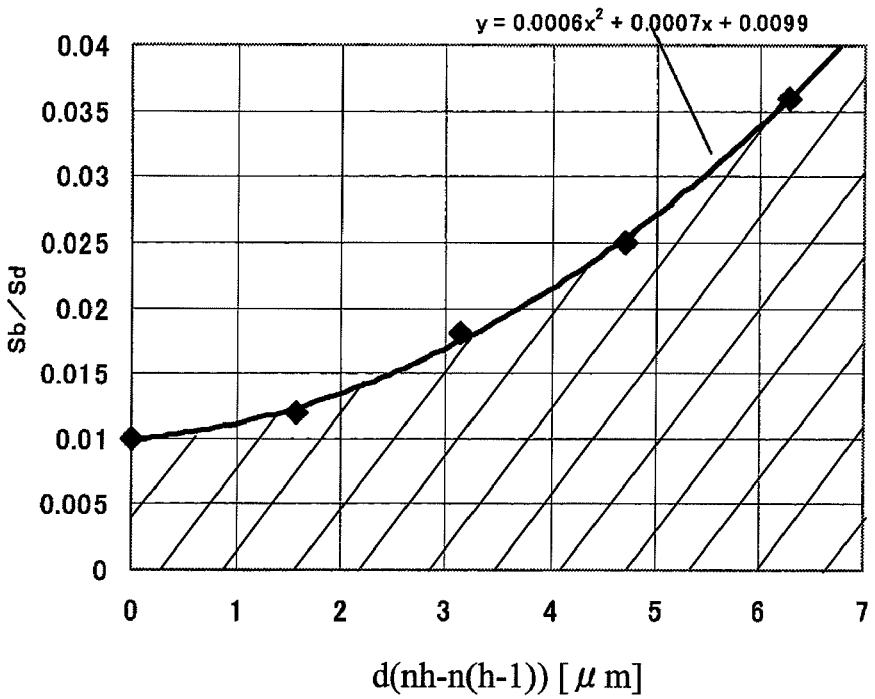
FIG. 6 is a diagram showing the relation of focus fluctuation amounts with respect to Sb/Sd and the refractive index difference d·(nh−n(h−1)) of neighboring base materials in the invention.
Figure 7:
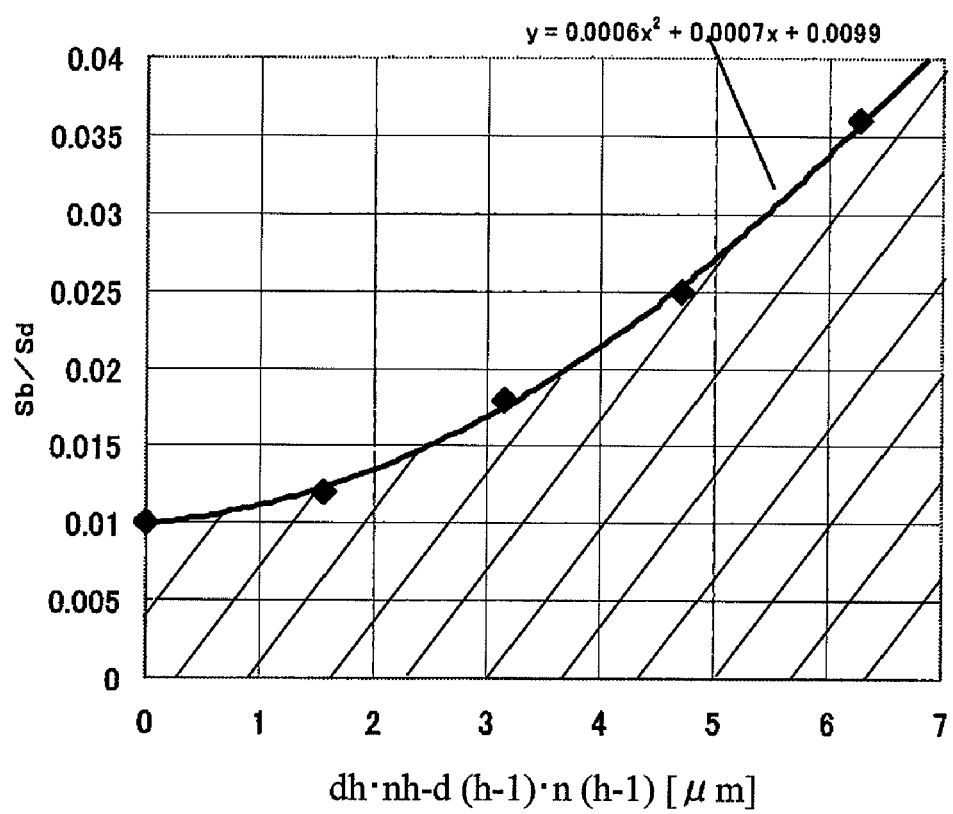
FIG. 7 is a diagram showing the relation of focus fluctuation amounts with respect to Sb/Sd and the refractive index difference product (dh·nh−d(h−1)·n(h−1)) of neighboring base materials in the invention.

In the second embodiment, the conditions under which the focus fluctuation amount becomes 10% or less are calculated by the thickness difference between the neighboring base materials (dh−d(h−1)), concretely, (d4−d3) and the light quantity ratio Sb/Sd of Sb as unnecessary light to Sd including an inherently necessary signal. In a third embodiment, also in the case where there is no base material thickness difference, that is, in the case where the base material thickness dh between the signal recording faces is almost constant, by changing the refractive index of the base material between the signal recording faces, similar effects can be obtained. In this case, when the thickness between the signal recording faces is d$\mu$m and the refractive index of the base material between the signal recording face "h" and the signal recording face "h−1" is nh, by setting the transmittance th, reflectance $\alpha$h, and the refractive index nh so as to satisfy the relation of $((\alpha(h-1)^2 \times \alpha(h-2))/(th^2 \times \alpha h)) \leq 0.0006 \times (d \times (nh-n(h-1)))^2 + 0.0007 \times (d \times (nh-n(h-1))) + 0.0099$, the focus fluctuation amount can be suppressed to 10% or less. Thus, a stable signal can be obtained. FIG. 6 shows the relation of the focus fluctuation amount. A region of the focus fluctuation amount of 10% or less in which the system is stable is a hatched portion in FIG. 6. Although the configuration in which the distance between the information recording faces is d$\mu$m which is almost constant has been described in the invention, similar effects can be obtained also by changing the refractive index nh of the base material between neighboring information recording faces in addition to the configuration in which the distance dh$\mu$m between neighboring information recording faces is changed in the second embodiment. In this case, when the distance between the signal recording face "h" and the signal recording face "h−1" is dh$\mu$m, by setting the transmittance th, reflectance $\alpha$h, the refractive index nh, and the thickness dh$\mu$m so as to satisfy the relation of $((\alpha(h-1)^2 \times \alpha(h-2))/(th^2 \times \alpha h)) \leq 0.0006 \times (dh \times nh - (d(h-1) \times n(h-1)))^2 + 0.0007 \times (dh \times nh - (d(h-1) \times n(h-1))) + 0.0099$, the focus fluctuation amount can be suppressed to 10% or less. Thus, an optical recording medium capable of obtaining a stable signal can be realized. FIG. 7 shows the relation of the focus fluctuation amount. A region of the focus fluctuation amount of 10% or less in which the system is stable is a hatched portion in FIG. 7.

Although the embodiments of the present invention have been described above, by forming a phase-change recording film or a recording film made of a material containing an organic coloring matter on the signal recording face of any of the optical recording media, a recordable optical recording medium can be provided. By printing a label or the like on the face opposite to the surface irradiated with light from an optical pickup of the optical recording medium of the present invention, the optical recording medium can be identified easily.

Fourth Embodiment

Figure 8:
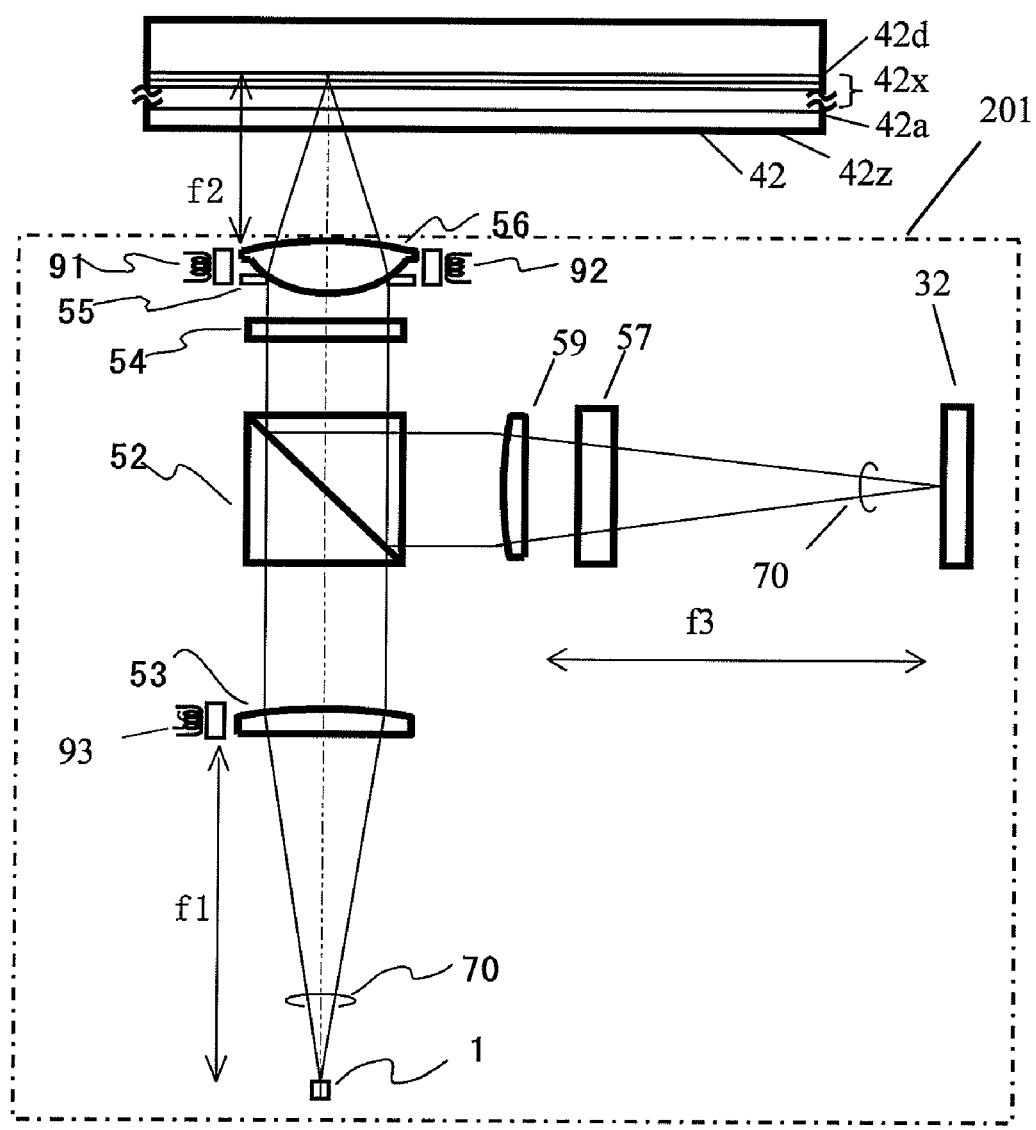
FIG. 8 is a diagram showing an outline of the configuration of an optical recording medium and an optical pickup in the invention.

FIG. 8 is a diagram showing an example of the configuration of an optical recording medium 42 and the optical pickup head apparatus 201 according to a fourth embodiment.

The optical recording medium 42 has n (n denotes an integer of 4 or larger) information recording faces. An information recording face 42a closest to the surface 42z of the optical recording medium 42, an information recording face 42d furthest from the surface 42z, and an information recording face group 42x disposed between the information recording faces 42a and 42d are formed. The interlayer distance from the surface 42z to the information recording face 42a is d(1), and each of the interlayer distances between neighboring information recording faces up to the information recording face 42d is d(n).

The case of recording/reproducing information to/from the information recording face 42d will be described.

A light source 1 emits a linearly-polarized divergent beam 70 having a wavelength $\lambda$ of 405 nm. The beam 70 emitted from the light source 1 is transformed by a collimate lens 53 having a focal length f1 of 18 mm to parallel rays. After that, the parallel rays pass through a polarization beam splitter 52 and a quarter-wave plate 54 where the rays are transformed to circularly polarized light. The circularly polarized light is converted to a converged beam by an objective lens 56 having a focal length f2 of 2 mm. The converged beam passes through a transparent substrate formed on the optical recording medium 42 and is condensed onto the information recording face 42d. The opening of the objective lens 56 is regulated by an aperture 55, and numerical aperture NA is 0.85. The collimate lens 53 is adjusted in the optical axis direction by using spherical aberration correcting units 93 constructed by a stepping motor or the like so that the spherical aberration becomes the minimum on the information recording face 42d.

The beam 70 reflected by the information recording face 42d passes through the objective lens 56 and the quarter-wave plate 54 and is transformed to a linearly polarized beam which is different from the incoming linearly polarized beam by 90 degrees, and is reflected by the polarization beam splitter 52. The beam 70 reflected by the polarization beam splitter 52 passes thorough a condenser lens 59 whose focal length f3 is 30 mm and a cylindrical lens 57 and enters a photodetector 32. Astigmatism is given to the beam incident on the photodetector 32 when the beam passes through the cylindrical lens 57.

The photodetector 32 has not-shown four light receiving parts and outputs current signals according to received light amounts. From the current signals, a focus error (hereinbelow, called FE) signal according to the astigmation method, a tracking error (hereinbelow, called TE) signal according to the push-pull method, and an information (hereinbelow RF) signal recorded on the recording medium 42 are generated. The FE signal and the TE signal are subjected to amplification and phase-compensation to a desired level, and the resultant signals are supplied to actuators 91 and 92 and subjected to focus and tracking controls.

The objective lens 56 is designed so that spherical aberration becomes zero in an intermediate position between the information recording faces 42a and 42d. Therefore, the largest spherical aberration occurs in the case where the beam is condensed to the information recording faces 42a and 42d as information recording faces which are the furthest from the position. When the position of the collimate lens 53 is adjusted in the optical axis direction by the spherical aberration correcting units 93 in order to eliminate the spherical aberration, a third-order component as a major component in the spherical aberration can be eliminated and the spherical aberration can be largely reduced. However, components of higher-order (mainly fifth-order components) cannot be eliminated. The size increases toward the information recording face 42a or 42d, and it worsens jitter.

Figure 9:
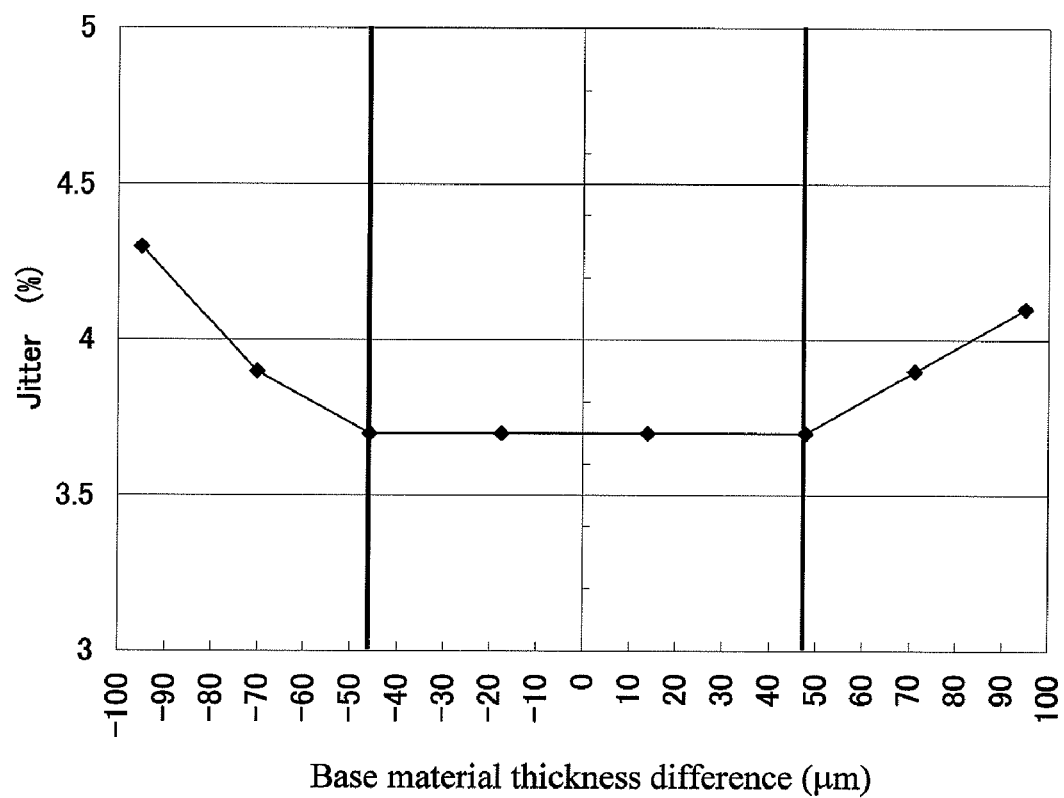
FIG. 9 is a diagram showing the relation between the difference between thicknesses of base materials in the optical recording medium and jitter in the invention.

FIG. 9 is a diagram showing the relation between the base material thickness difference and jitter in the optical recording medium 42 according to the fourth embodiment. The axis of abscissa denotes the base material thickness difference as the difference between depth of an information recording face in which jitter is calculated and a reference position which is an intermediate position between the information recording faces 42a and 42d in the optical recording medium 42, and the axis of ordinate indicates the jitter. The diagram shows a simulation result calculated in consideration of only the spherical aberration as a cause of deteriorating the jitter with parameters of NA of 0.85, wavelength of 405 nm, refractive index of 1.62, track pitch of 0.32 $\mu$m, and the shortest pitch length of 0.149 $\mu$m.

It is understood from FIG. 9 that the jitter is almost constant in the range of the base material thickness difference from about −46 µm to about +48 µm, and the jitter deteriorates out of the range. Therefore, by setting the depth positions of all of the information recording faces within the range of ±45 µm of the base material layer difference including variations (that is, the total interlayer distance as the distance between the information recording faces 42*a* and 42*d* is 90 µm or less), stable recording/reproduction can be realized without deteriorating the jitter.

In the embodiment, the interlayer distances d(1) to d(n) µm are set so as to satisfy the following equation when variations in the thickness of the interlayer distances are ±e(1) to ±e(n) µm.

$$|d(i)-d(k)| \geq e(i)+e(k)+1 \text{ (where i and k are integers satisfying } 1 \leq i \leq n \text{ and } 1 \leq k \leq n \text{ and } i \neq k)$$

The thickness of arbitrary two layers are set so as to have the thickness difference of at least 1 µm including a thickness variation amount of each layer. In the case where predetermined two layers do not have a thickness difference of at least 1 µm including a thickness variation amount, reflection light whose focus is achieved on the back side of another layer is mixed with reflection light of a recording layer to/from which information is recorded/reproduced, and recording/reproduction is disturbed.

Figure 10A:
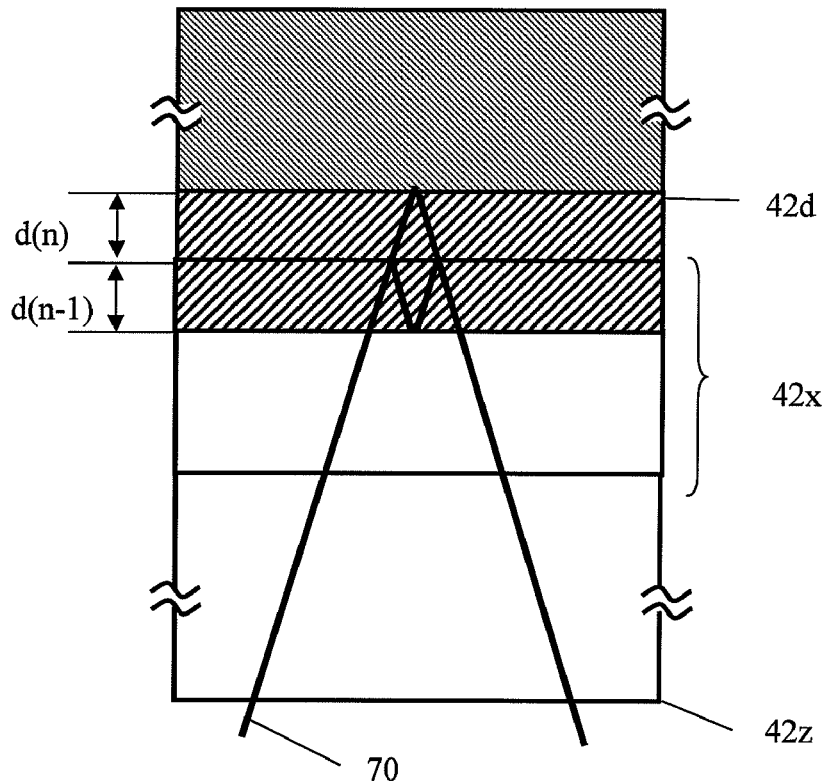
FIGS. 10A and 10B are relation diagrams showing FS signal amplitude and a thickness difference of neighboring two layers, of the optical recording medium in the invention.
Figure 10B:
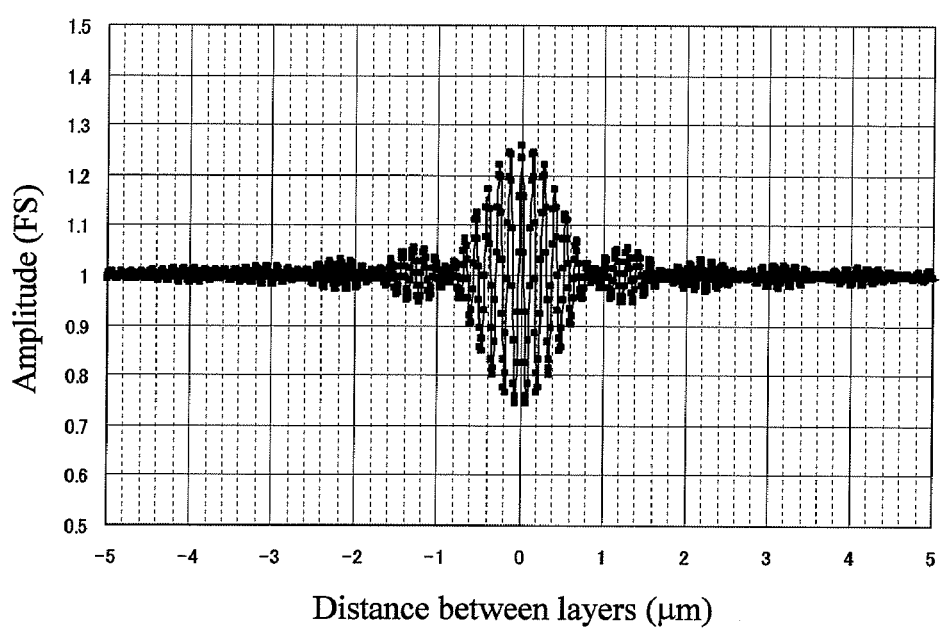

FIGS. 10A and 10B are diagrams showing the relation between the amplitude of an FS signal of a predetermined recording/reproduction layer and the thickness difference between neighboring two layers in the optical recording medium 42 in the fourth embodiment.

The amplitude of an FS signal at the time of recording/reproducing information to/from the information recording face 42*d* shown in the cross-sectional view of the optical recording medium 42 in FIG. 10A is actually measured while changing the thickness difference between d(n) and d(n−1). As shown in FIG. 10B, when the thickness difference between neighboring two layers becomes smaller than 1 µm, the amplitude of the FS signal largely increases. It is therefore understood that the minimum thickness difference of 1 µm or more is necessary (hereinbelow, 1 µm is described as the minimum value "emin" of the distance between layer surfaces).

The increase in the FS signal amplitude is not limited to the case where two layers are adjacent to each other.

Figure 11:
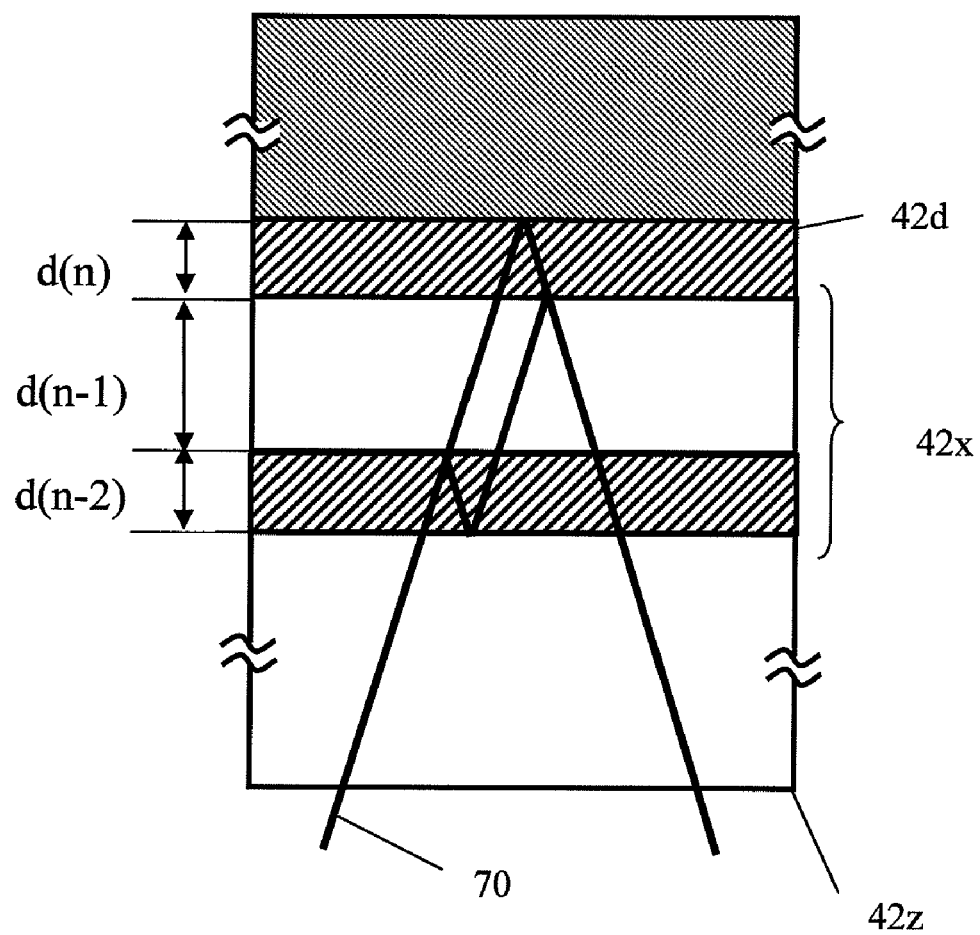
FIG. 11 is a cross-sectional view of an example of an information recording face in which the thicknesses of two layers which are not neighboring are same in the invention.

FIG. 11 is a cross-sectional view of an information recording face as an example that two layers which are not adjacent to each other have the same thickness in the optical recording medium 41.

In FIG. 11, in the case where the difference between the thicknesses d(n) and d(n−2) of two layers which are not adjacent to each other including a variation amount is smaller than 1 µm, a part of the beam 70 condensed to record/reproduce information to/from the information recording face 42*d* is reflected three times in the information recording face group 42*x* and is mixed with reflected light from the information recording face 42*d* from which information is to be inherently read. Consequently, the distances d(1) to d(n) µm each between layer surfaces have to be set so that arbitrary two layers, which may not be adjacent to each other, have the thickness difference of at least 1 µm including variations.

Further, in the case where n is 4 or larger, for arbitrary d(j) (j denotes an integer satisfying 4≦j≦n), the following equation has to be satisfied.

$$|d(j-3)+d(j-2)-d(j-1)-d(j)| \geq e(j-3)+e(j-2)+e(j-1)+e(j)+1$$

Figure 12:
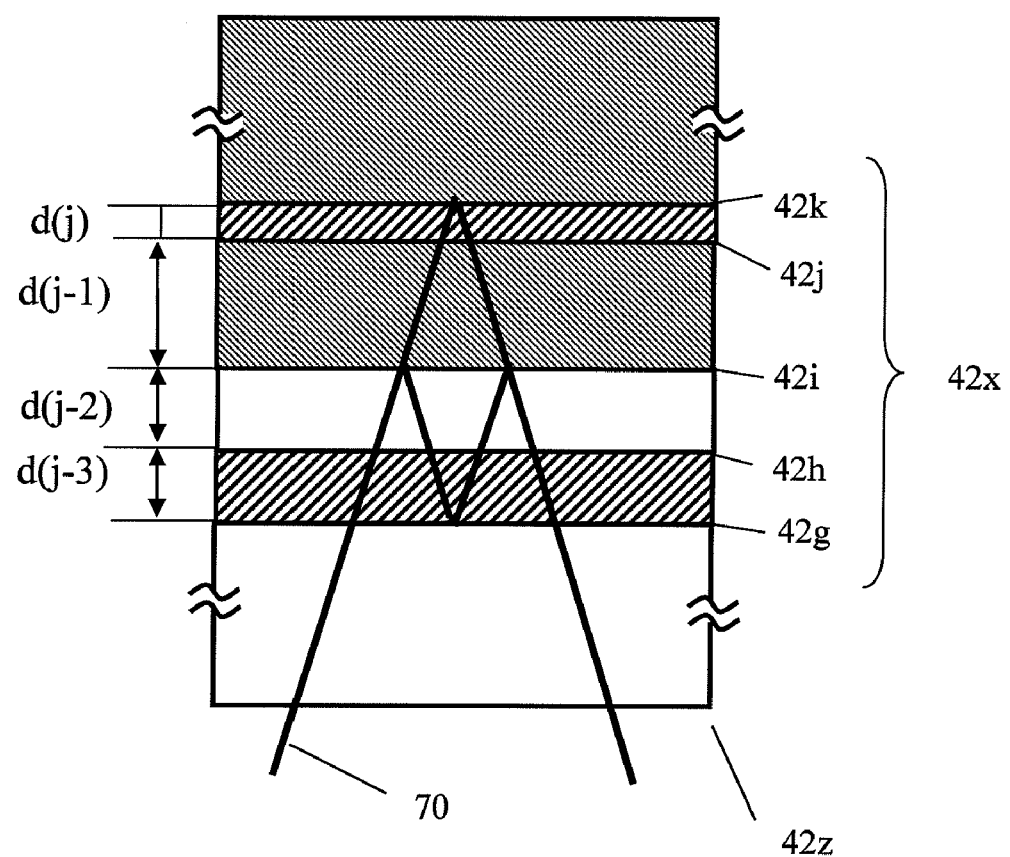
FIG. 12 is a cross-sectional view of an example of an optical recording medium 42 in the invention.

FIG. 12 is a cross-sectional view of an example of the optical recording medium 42 of the fourth embodiment.

In the case where the distances each between layer surfaces between continuous five information recording faces 42*g*, 42*h*, 42*i*, 42*j*, and 42*k* are sequentially set as d(j−3), d(j−2), d(j−1), and d(j), and d(j−3)+d(j−2) and d(j−1)+d(j) do not have a thickness difference of 1 µm or larger including variations, a part of the beam 70 condensed to record/reproduce information to/from the information recording face 42*k* is reflected by the information recording face 42*i*, reflected by the back side of the information recording face 42*g*, and is mixed with reflected light from the information recording face 42*k* from which information is to be inherently read. Therefore, at least the above has to be satisfied.

The minimum distance between layer surfaces (hereinbelow, "tmin") of the distances d(1) to d(n) µm each between layer surfaces of the fourth embodiment is set to 8 µm or larger. In the case where the distance between information recording faces is too small, the influence of crosstalk from the neighboring information recording face is exerted. Consequently, the distance between layer surfaces of a predetermined value or more is necessary. For example, when the beam 70 is condensed to the information recording face 42*d* and the distance d(n) between layer surfaces is large, the spot diameter of the beam 70 on the neighboring information recording face is larger than that on the information recording face 42*d*. Consequently, the influence of a recording pit on the information recording face becomes relative small as compared with the spot diameter, and the influence on the recording/reproduction of information to/from the information recording face 42*d* becomes smaller. However, as the distance d(n) between layer surfaces decreases, its influence increases, so that the distance between layer surfaces of a predetermined value or larger is required. The minimum distance between layer surfaces of a two-layer disk in a DVD (NA=0.6 and wavelength=0.66 nm) which is widely spread in recent years is 40 µm. In the embodiment, equivalent parameters are calculated and a necessary minimum distance between layer surfaces is set. Concretely, in the case where a beam is condensed to one of the layers in the DVD, the spot diameter on the other layer is obtained by 40 µm/n·tan (arc sin(NA)) when the refractive index is "n". In the embodiment (NA=0.85 and wavelength=0.405 nm), the track pitch and the recording pit size can be reduced in proportion to the wavelength/NA as compared with a DVD. The spot diameter is allowed to be decreased in proportion to the wavelength/NA. From the parameters, the spot diameter on a neighboring information recording face in the embodiment is calculated and the distance between layer surfaces equivalent to the distance 40 µm between layer surfaces of the two-layer disk of a DVD is inversely calculated as 8 µm.

Figure 13:
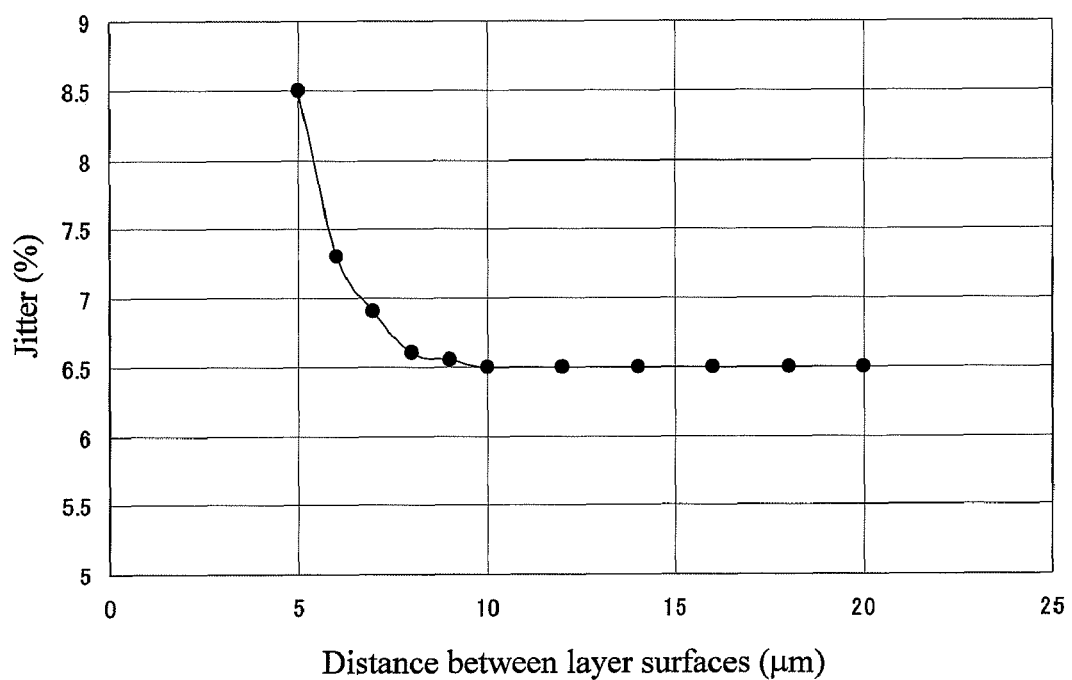
FIG. 13 is a diagram showing the relation between actually measured jitter and layer-to-layer distance in the invention.

FIG. 13 is a diagram showing the relation between actually measured jitter and the distance between layer surfaces.

When the distance between layer surfaces becomes smaller than 10 µm, jitter starts deteriorating. When the distance between layer surfaces becomes smaller than 8 µm, the jitter deteriorates sharply. Consequently, by setting the distance between layer surfaces to 8 µm or larger, the influence from adjacent information recording faces is reduced, and recording/reproduction with little noise can be realized.

Figure 14:
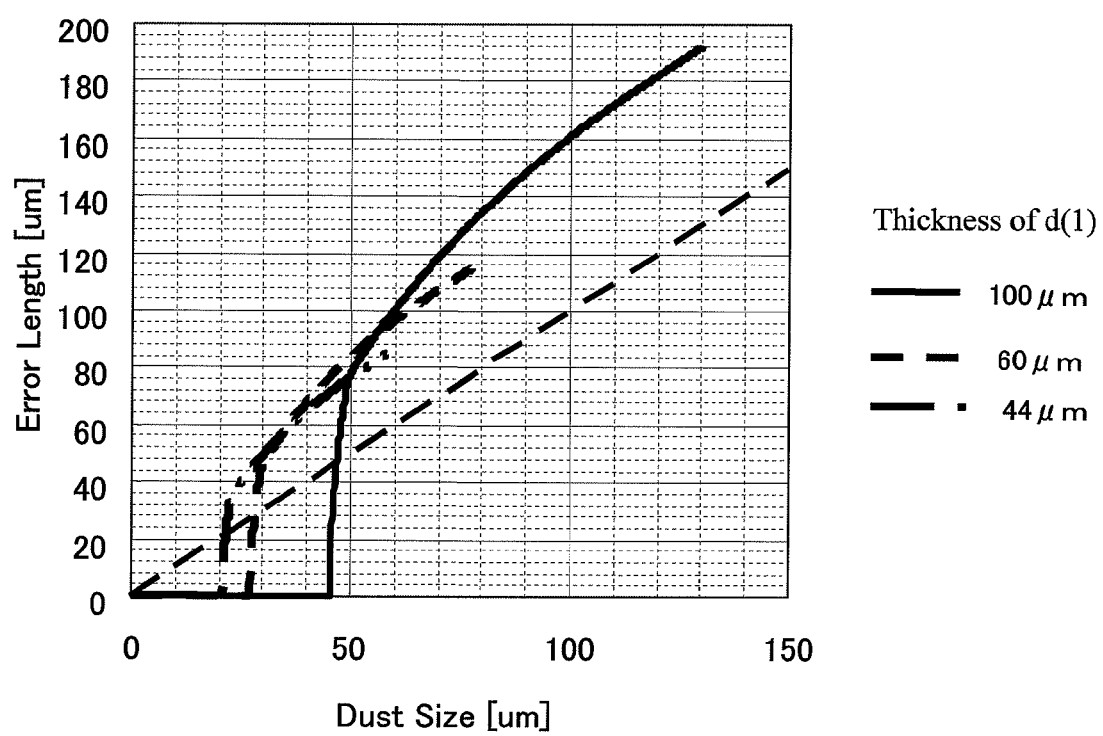
FIG. 14 is a diagram showing the relation between the size of dust adhered to the surface of the optical recording medium and error length in the invention.

Next, the distance d(1) between layer surfaces as the thickness of a protection layer of the optical recording medium 42 is set to 50 µm or larger. FIG. 14 is a diagram showing the relation between the size of a dust adhered to the surface of an optical recording medium and error length. In the case where there is a dust on the surface of the optical recording medium 42, when d(1) as the length from the surface to the information recording face is small, the influence on recording/reproduction increases. As shown in FIG. 14, when d(1) is 100 µm, the error length is zero for a dust of about 45 μm or less. In the case where d(1) is 60 μm, the error length is zero for a dust of about 27 μm or less. In the case where d(1) is 44 μm, the error length is zero for a dust of about 20 μm or less. The smaller d(1) is, an error occurs in a smaller dust. On the other hand, with respect to dusts floating in the atmosphere, the ratio of dusts having a size of 20 μm or less is very high. It is said that dusts having a size of 25 μm or less occupy 80% of the total. Therefore, to prevent occurrence of an error with a dust having a size of 25 μm or less, the thickness d(1) is set to 50 μm or larger.

As described above, in the fourth embodiment, the total distance as the distance between the information recording faces 42a and 42d is set to 90 μm or less, so that occurrence of a jitter caused by the spherical aberration is suppressed and stable recording/reproduction can be realized.

Two arbitrary layers of distances have the thickness difference of at least 1 μm including a thickness variation amount, and four continuous layers are set so that the total thickness of two layers and that of the other two layers have a thickness difference of at least 1 μm including the variation amount. Consequently, reflection light from the recording layer to/from which information is recorded/reproduced is not mixed with reflection light achieving focus on the back side of another layer, and stable recording/reproduction can be realized.

Since the minimum distance between layer surfaces is set to 8 μm or larger, the influence from the neighboring information recording face is reduced, and recording/reproduction with little noise can be realized.

In addition, the thickness of d(1) is set to 50 μm or larger, so that very reliable recording/reproduction with the small number of recording/reproduction errors caused by dusts can be realized.

Although the spherical aberration correction is performed by moving the collimate lens 53 in the optical axis direction by using the spherical aberration correcting units 93 in the embodiment, the invention is not limited to the embodiment. Similar effects can be obtained by a configuration capable of generating a three-dimensional spherical aberration or pseudo three-dimensional aberration of a size which can cancel out the spherical aberration occurring in the optical recording medium 42. For example, two lenses may be employed in place of the collimator lens 53 and the distance between the lenses is changed, thereby making the beam 70 converged or diverged. It is also possible to employ a liquid crystal panel in place of the collimate lens 53 and make the beam 70 converged or diverged by partially changing the phase of the beam 70 that passes.

Fifth Embodiment

An example of the configuration of an optical recording medium 43 and an optical pickup head apparatus 201 in a fifth embodiment is similar to that of FIG. 2.

Figure 15:
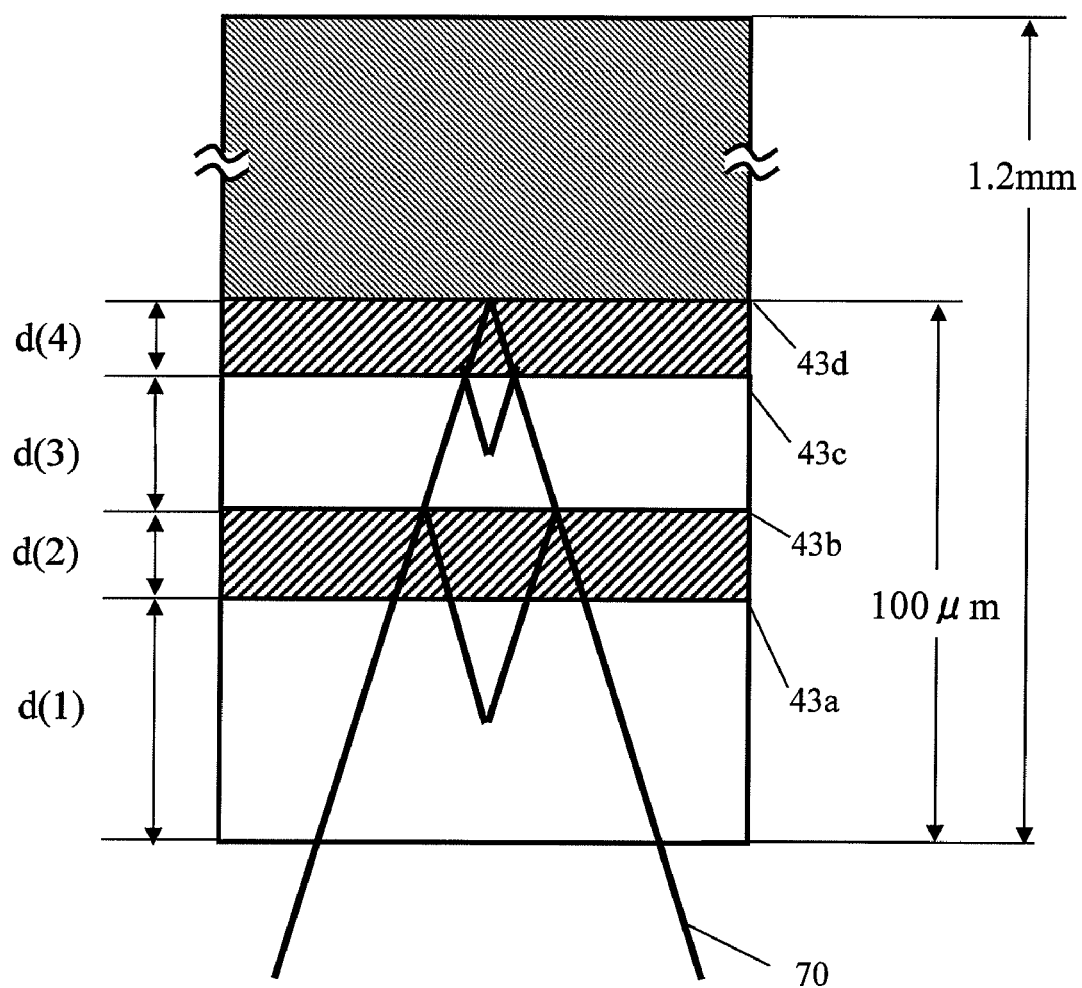
FIG. 15 is a cross-sectional view of an optical recording medium in the invention.
Figure 19:
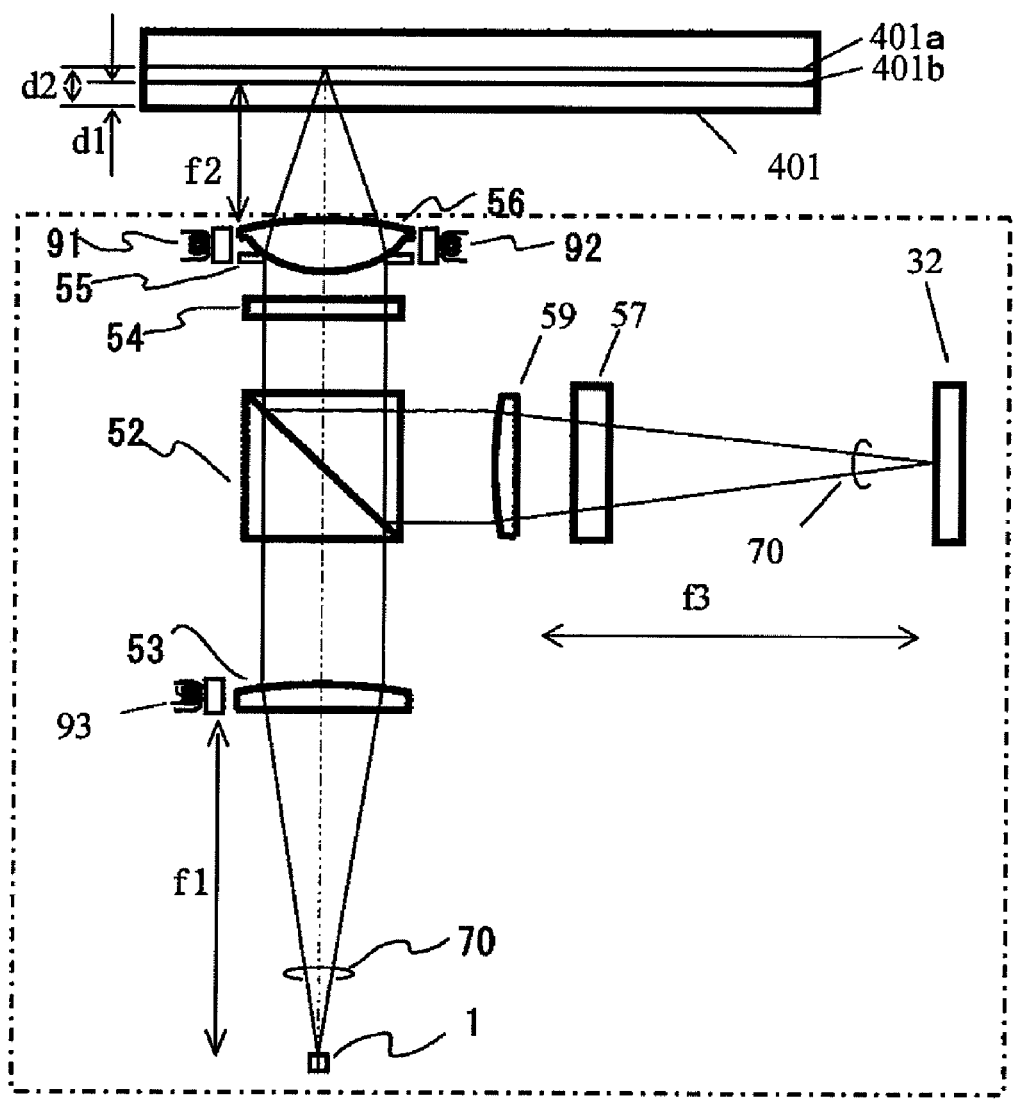
FIG. 19 is a diagram showing the configuration of an optical recording medium and an optical pickup head constructing a conventional optical information apparatus.
Figure 20:
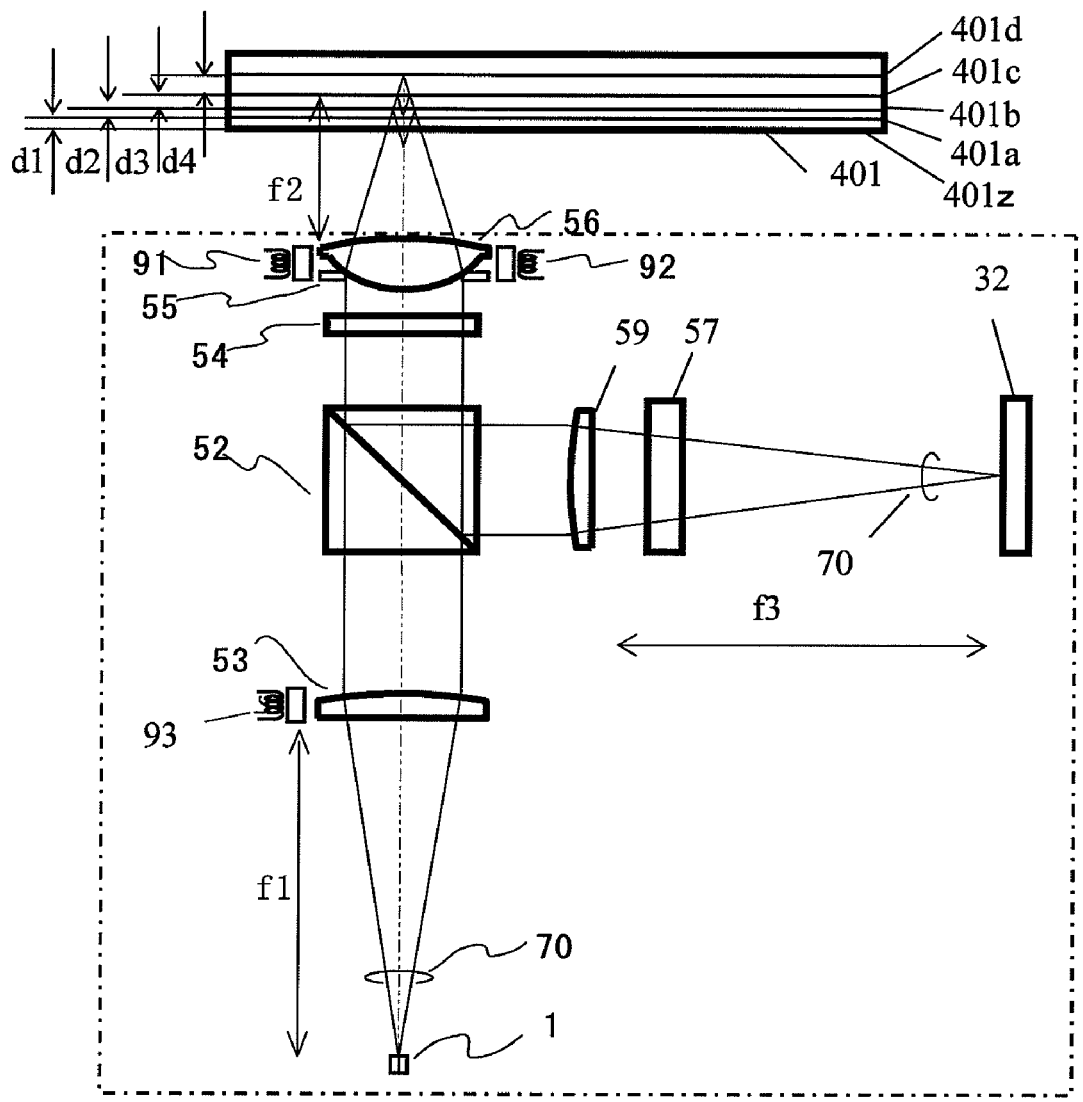
FIG. 20 is a diagram showing the configuration of another optical recording medium and an optical pickup head constructing a conventional optical information apparatus.

FIG. 15 is a cross-sectional view of the optical recording face 43 according to the fifth embodiment.

In FIG. 15, a total average value of the distances d(1) to d(4) is 100 μm.

A high-density optical disk called a BD which is developed in recent years uses a laser having the wavelength of 405 nm and an objective lens of NA 0.85, which is the same as this embodiment. The information recording faces exist at the depths of 75 μm (first layer) and 100 μm (the zeroth layer). By setting the total of d(1) to d(4) to 100 μm, the depth of the information recording face 43d is made equal to the zero-th order of a BD. There are consequently advantages such that compatibility can be easily obtained and a system margin such as a tilt margin can be sufficiently assured.

When candidate values of the distances d(1), d(2), d(3), and d(4) are set as t1, t2, t3, and t4 (t1<t2<t3<t4), their distance variations are described as ±f1, ±f2, ±f3, and ±f4, respectively, and the minimum distance value 1 μm is described as emin, necessary conditions for t1, t2, t3, and t4 can be expressed as follows.

$$t1 = tmin + f1$$
$$t2 = t1 + f1 + f2 + emin$$
$$= tmin + 2f1 + f2 + emin$$
$$t3 = t2 + f2 + f3 + emin$$
$$= tmin + 2f1 + 2f2 + f3 + 2emin$$
$$t4 = 100 - (t1 + t2 + t3)$$

Further, the distance variations ±f1, ±f2, and ±f3 have to be set within the range that t1+t2+t3 is equal to or less than 90 μm. To set the distance d(1) to 50 μm or larger and to set the total sum of the distances d(1) to d(4) equal to 100 μm, d(1) has to be the maximum value t4 among t1, t2, t3, and t4.

When the total sum of the distances d(1) to d(4) lies in the range of 100±12 μm, advantages similar to the above can be obtained.

FIG. 16 is a diagram showing an example of combinations of distances in which reflected light from an information recording face to/from which information is recorded/reproduced may be mixed with reflected light that comes into a focus on the back side of another layer in the embodiment.

In FIG. 16, for example, the combination 3 relates to the case where light is condensed on a recording/reproduction face 43d to perform recording/reproduction, a part of the beam 70 is reflected by another information recording face 43a, and is condensed on the back side of the surface 43z. The distance from the surface 43z to the information recording face 43a is described as A, and the distance from the information recording face 43a to the information recording face 43d is written as B. The condition that reflected light from the information recording face 43d is not mixed with reflected light from the back side of the surface 43z is that the difference between the total sum of A and the total sum of B is larger than a value obtained by adding variations of the distances by 1 μm or more. This condition has to be satisfied with respect to all of the ten combinations shown in FIG. 16.

Since d(1) is 50 μm or larger, the conditions of the combination 3 can be written as follows.

$$d(1)=t4 \geq (t1+t2+t3)+(f1+f2+f3+f4)+emin$$

The conditions are rewritten by the distances d(1) to d(4) and their variations e(1) to e(4) as follows.

$$d(1) \geq d(2)+d(3)+d(4)+e(1)+e(2)+e(3)+e(4)+emin$$

In the case where d(1) satisfies the condition, the combinations 1, 2, 4, 5, and 6 are accordingly satisfied. The combinations 7 and 9 are satisfied from formulae of t1 to t3. To satisfy all of the conditions in FIG. 16, it is a necessary and sufficient condition to satisfy the combinations 8 and 10 as well.

$$|d(2)+d(3)-d(4)| \geq e(2)+e(3)+e(4)+emin \text{ and}$$

$$|d(2)-d(3)-d(4)| \geq e(2)+e(3)+e(4)+emin$$

In the case where d(3)=t3 (the maximum value among t1 to t3), the above two conditions are satisfied. For example, when d(3)=t3, d(2)=t1, d(4)=t2, e(3)=f3, e(2)=f1, and e(4)=f2, the condition 8 is expressed as follows.

$$|d(2)+d(3)-d(4)|=t\min+f1+f2+f3+e\min \geqq e(2)+e(3)+e(4)+e\min$$

The condition 10 is expressed as follows and is satisfied.

$$|d(2)-d(3)-d(4)|=t\min+3f1+3f2+f3+3e\min \geqq e(2)+e(3)+e(4)+e\min$$

d(3)=t3 is not the condition necessary to satisfy the combinations 8 and 10.

FIG. 17 is a diagram showing an example of combinations of the distances in the embodiment.

When tmin=8 μm, emin=1 μm, and f1=f2=f3=f4=1.5 μm, t1=9.5 μm, t2=13.5 μm, t3=17.5 μm, and t4=59.5 μm. When t3 as the maximum value among t1 to t3 is set to d(3), d(1)=t4=59.5 μm, d(2)=t2=13.5 μm, d(3)=t3=17.5 μm, and d(4)=t1=9.5 μm, e(1)=f1=e(2)=f2=e(3)=f3=e(4)=f4=1.5 μm. Consequently, the difference between A and B becomes larger than the variation fluctuation amount in all of the combinations. It is understood that the reflection light from the recording/reproduction face is not mixed with reflection light from the back side of another layer, and stable recording/reproduction can be performed. Since the condition d(2)+d(3)+d(4)=40.5 μm≦90 μm is satisfied, the absolute amount of spherical aberration which occurs can be suppressed, and the aberration residual of the spherical aberration performed by the spherical aberration correcting units 93 can be reduced. Crosstalk from adjacent information recording layers is small and, further, reflection light from the information recording face to/from which information is recorded/reproduced is not mixed with reflection light that comes into a focus on the back side of another layer. Thus, stable recording/reproduction can be realized. Since the thickness d(1) of 50 μm or more is assured, the influence of dusts and the like can be suppressed within a permissible range. Since the total of d(1) to d(4) is set as 100 μm, the depth of the information recording face 43d becomes equal to the zero-th layer of a BD, and compatibility can be easily obtained.

The thickness d(2) and that of d(4) can be replaced with each other. When the total sum of the distances d(1) to d(4) lies within the range of 100±12 μm, advantages similar to the above-described advantages can be obtained. In the example of FIG. 17, d1≧50 (μm), d2+d3+d4≧24 (μm), d2+d3+d4≦90 (μm), and |d4+d3−d2−d1|≧1 (μm). When those conditions are satisfied, a signal can be stably recorded.

The combinations of the distances satisfying the above-described conditions are not limited to the example shown in FIG. 17. For example, the conditions can be satisfied by the combinations of the distances shown in FIG. 18.

Other Embodiments

The foregoing embodiments may be properly combined. For example, by an optical recording medium satisfying the conditions of the first embodiment and the conditions of the fourth embodiment, the effects of the invention can be obtained.

Further, the foregoing embodiments have been described that the number of information recording faces is four. The invention is not limited to the number but the number may be, for example, three. In this case, an optical recording medium is constructed in such a manner that first to third information recording faces are provided from the side close to the surface, the distance from the surface to the first information recording face is d1 (μm), the distance from the first information recording face to the second information recording face is d2 (μm), and the distance from the second information recording face to the third information recording face is d3 (μ), and d1≧50 (μm), d2+d3≧16 (μm), d2+d3≦90 (μm), and |d3−d2−d1|≧1 (μm) are satisfied.

INDUSTRIAL APPLICABILITY

The present invention is useful to realize a high-density and high-capacity optical recording medium and the like.

The invention claimed is:

1. An optical recording medium having a plurality of information recording faces,
   wherein when a first information recording face and an h-th information recording face are set from the side close to the surface of the optical recording medium (where h denotes an integer satisfying h≧2),
   reflectance of the surface is set as α0, reflectance of the first information recording face is set as α1, and reflectance of the h-th information recording face is set as αh, and
   transmittance from the surface to the first information recording face is set as t1, and transmittance from the (h−1)th information recording face to the h-th information recording face is set as th,
   $((\alpha(h-1)^2 \times \alpha(h-2))/(th^2 \times \alpha h)) < 0.01$ is satisfied.

2. The optical recording medium according to claim 1, wherein four information recording faces are provided.

3. The optical recording medium according to claim 1, wherein a phase-change recording film is provided on the information recording face.

4. The optical recording medium according to claim 1, wherein a recording film made of a material containing an organic coloring matter is provided on the information recording face.

5. The optical recording medium according to claim 1, wherein a label is provided on a face on the side opposite to the surface of the optical recording medium.

6. A method of recording/reproducing information to/from the optical recording medium according to claim 1, the method comprising:
   performing at least one of recording and reproduction of information by using an optical head having aberration correcting units for correcting aberration which occurs depending on thickness of a protection layer of the optical recording medium.

7. An apparatus for recording/reproducing information to/from the optical recording medium according to claim 1, comprising:
   an optical head for emitting light to the optical recording medium, and achieving a focus of the light on a desired information recording face in the optical recording medium;
   a controller for controlling the optical head;
   a rotating unit for rotating the optical recording medium; and
   recording/reproducing units for performing at least one of recording and reproduction of information to/from the optical recording medium.

8. An apparatus for recording/reproducing information to/from the optical recording medium according to claim 1, comprising:
   an optical head for emitting light to the optical recording medium, and achieving a focus of the light on a desired information recording face in the optical recording medium;
a controller for controlling the optical head;
a rotating unit for rotating the optical recording medium;
recording/reproducing units for performing at least one of recording and reproduction of information to/from the optical recording medium; and
spherical aberration correcting units for making the light emitted to the optical recording medium diverged or converged in accordance with an information recording face to/from which information is recorded/reproduced.

* * * * *